US012720595B2

(12) United States Patent
Li et al.

(10) Patent No.: US 12,720,595 B2
(45) Date of Patent: Aug. 25, 2026

(54) MULTI-LINK SYNCHRONOUS TRANSMISSION METHOD AND APPARATUS

(71) Applicant: HUAWEI TECHNOLOGIES CO., LTD., Shenzhen (CN)

(72) Inventors: Yunbo Li, Shenzhen (CN); Yuchen Guo, Shenzhen (CN); Ming Gan, Shenzhen (CN); Yiqing Li, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 705 days.

(21) Appl. No.: 18/174,124

(22) Filed: Feb. 24, 2023

(65) Prior Publication Data

US 2023/0217494 A1 Jul. 6, 2023

Related U.S. Application Data

(63) Continuation of application No. PCT/CN2021/113093, filed on Aug. 17, 2021.

(30) Foreign Application Priority Data

Aug. 29, 2020 (CN) ......................... 202010890981.7

(51) Int. Cl.
*H04W 74/0816* (2024.01)
*H04W 56/00* (2009.01)

(52) U.S. Cl.
CPC ..... *H04W 74/0816* (2013.01); *H04W 56/005* (2013.01)

(58) Field of Classification Search
None
See application file for complete search history.

(56) References Cited

U.S. PATENT DOCUMENTS

2021/0211375 A1* 7/2021 Kwon ................. H04W 72/535
2021/0282186 A1* 9/2021 Cherian ............ H04W 74/0816
2023/0354451 A1* 11/2023 Jang .................. H04W 74/0816

FOREIGN PATENT DOCUMENTS

CN 113923798 A 1/2022

OTHER PUBLICATIONS

Chinese Office Action issued in corresponding Chinese Application No. 202010890981.7, dated Jan. 3, 2023, pp. 1-7.
Young Hoon Kwon et al, Synchronous multi-link operation, IEEE 802.11-20/0427r1, Apr. 6, 2020, total 9 pages.

(Continued)

*Primary Examiner* — Jutai Kao
(74) *Attorney, Agent, or Firm* — HAUPTMAN HAM, LLP

(57) ABSTRACT

Embodiments of this application provides a multi-link synchronous transmission method and apparatus. The method includes: The transmit MLD sends a first transmission frame to the receive MLD at a first moment on the first link when a first condition is met. The first moment is determined based on a second moment and/or a third moment, the second moment is a moment at which a backoff counter of the first link decreases to 0, and the third moment is a sending moment of a second transmission frame on the second link. The first condition includes: (1) The backoff counter of the first link is 0, and (2) the second transmission frame is located in a transmission opportunity TXOP on the second link.

15 Claims, 32 Drawing Sheets

(56) References Cited

OTHER PUBLICATIONS

Young Hoon Kwon et al, Synchronous multi-link operation, IEEE 802.11-20/0427r3, Apr. 6, 2020, total 10 pages.
Yongho Seok et al, Synchronous Multi-link Transmission of Non-STR MLD, IEEE 802.11-20/1053r1, Aug. 5, 2020, total 17 pages.
Dmitry Akhmetov et al, Discussion on methods for synchronous ML operations, IEEE 802.11-20/0993r5, Aug. 2020, total 23 pages.
IEEE Std 802.11a-1999, Supplement to IEEE Standard for Information technology Telecommunications and information exchange between systems Local and metropolitan area networks Specific requirements Part 11: Wireless LAN Medium Access Control (MAC) and Physical Layer (PHY) specifications: High-speed Physical Layer in the 5 GHZ Band, Sep. 16, 1999, total 90 pages.
IEEE Std 802.11b-1999, Supplement to IEEE Standard forInformation technology Telecommunications and information exchange between systems Local and metropolitan area networks Specific requirements Part 11: Wireless LAN Medium Access Control (MAC) and Physical Layer (PHY) specifications: Higher-Speed Physical Layer Extension in the 2.4 GHz Band, Sep. 16, 1999, total 97 pages.
IEEE Std 802.11g-2003, IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band, Jun. 12, 2003, total 77 pages.
IEEE Std 802.11n-2009, IEEE Standard for Information technology Telecommunications and information exchange between systems Local and metropolitan area networks Specific requirements Part 11: Wireless LAN Medium Access Control (MAC) and Physical Layer (PHY) Specifications Amendment 5: Enhancements for Higher Throughput, Sep. 11, 2009, total 536 pages.
IEEE Std 802.11ac-2013, IEEE Standard for Information technology Telecommunications and information exchange between systems Local and metropolitan area networks Specific requirements Part 11: Wireless LAN Medium Access Control (MAC) and Physical Layer (PHY) Specifications Amendment 4: Enhancements for Very High Throughput for Operation in Bands below 6 GHZ, Dec. 11, 2013, total 425 pages.
IEEE P802.11ax/D6.0, Draft Standard for Information technology Telecommunications and information exchange between systems Local and metropolitan area networks Specific requirements Part 11: Wireless LAN Medium Access Control (MAC) and Physical Layer (PHY) Specifications Amendment 1: Enhancements for High Efficiency WLAN, Nov. 2019, total 780 pages.
IEEE Std 802.11-2016, IEEE Standard for Information technology Telecommunications and information exchange between systems Local and metropolitan area networks Specific requirements Part 11: Wireless LAN Medium Access Control (MAC) and Physical Layer (PHY) Specifications, Dec. 7, 2016, total 3534 pages.
IEEE P802.11be/D0.1, Draft Standard for Information technology Telecommunications and information exchange between systems Local and metropolitan area networks Specific requirements Part 11: Wireless LAN Medium Access Control (MAC) and Physical Layer (PHY) Specifications Amendment 8: Enhancements for extremely high throughput (EHT), Sep. 2020, total 299 pages.

* cited by examiner

Backoff
PPDU
AIFS
5
4
3
2
1
0

30
Transmit MLD
Receive MLD
301
302

S401
Determine that a first condition is met
S402
Access a channel at a first moment and send a first transmission frame on a first link

MULTI-LINK SYNCHRONOUS TRANSMISSION METHOD AND APPARATUS

CROSS-REFERENCE TO RELATED APPLICATION

This application is a continuation of International Application No. PCT/CN2021/113093, filed on Aug. 17, 2021, which claims priority to Chinese Patent Application No. 202010890981.7, filed on Aug. 29, 2020. The disclosures of the aforementioned applications are hereby incorporated by reference in their entireties.

TECHNICAL FIELD

This application relates to the field of communication technologies, and in particular, to a multi-link synchronous transmission method and apparatus.

BACKGROUND

To achieve a technical goal of extremely high throughput, the Institute of Electrical and Electronics Engineers (institute of electrical and electronics engineers, IEEE) 802.11be standard includes multi-link (multi-link, ML) communication as one of key technologies. A multi-link device (multi-link device, MLD) supporting ML communication has a capability of transmitting and receiving in multiple frequency bands. In this way, the MLD can use a larger bandwidth for data transmission, to significantly improve a throughput rate.

Depending on whether the MLD has a capability of simultaneous transmit and receive (simultaneous transmitting and receiving, STR) on different links, the MLD may be classified into an STR MLD and a non-STR MLD. One link may be a spatial path through which the MLD performs data transmission in one frequency band. The STR MLD has the STR capability, and the non-STR MLD does not have the STR capability.

In a scenario in which a non-STR MLD participates in communication, transmission frame synchronization on multiple links is an important part. Therefore, it is necessary to design a proper solution to implement synchronous transmission on the multiple links in the scenario.

SUMMARY

Embodiments of this application provide a multi-link synchronous transmission method and apparatus, to implement synchronous transmission on multiple links, reduce interference between the multiple links, and improve transmission performance.

To achieve the foregoing objectives, the following technical solutions are used in embodiments of this application.

According to a first aspect, a multi-link synchronous transmission method is provided. Links between a transmit MLD and a receive MLD include a first link and a second link. One of the transmit MLD and the receive MLD has a simultaneous transmit and receive STR capability, and the other does not have the STR capability. The method includes: The transmit MLD sends a first transmission frame to the receive MLD at a first moment on the first link when a first condition is met. The first moment is determined based on a second moment and/or a third moment, the second moment is a moment at which a backoff counter of the first link decreases to 0, and the third moment is a sending moment of a second transmission frame on the second link. The first condition includes: (1) The backoff counter of the first link is 0, and (2) The second transmission frame is located in a transmission opportunity TXOP on the second link.

In other words, the transmit MLD performs a backoff procedure on the first link to contend for a channel, and the TXOP has been successfully established on the second link. In view of this, when the backoff counter of the first link decreases to 0, the channel may be accessed on the first link for transmission, and the second transmission frame may be sent in the TXOP on the second link through the channel obtained through contention. In this case, the transmit MLD may determine, based on the moment at which the backoff counter decreases to 0 and the sending moment of the second transmission frame on the second link, a moment at which the first transmission frame is sent on the first link. An end time of a transmission frame sent on the first link is aligned as much as possible with an end time of a transmission frame sent on the second link. Alternatively, a start time and the end time of the transmission frame sent on the first link are aligned with a start time and the end time of the transmission frame sent on the second link respectively. This implements synchronous transmission on multiple links, reduces interference between the multiple links, and improves transmission performance.

In some possible designs, the first condition further includes: A third transmission frame on the first link fails to be transmitted. The first transmission frame is used to retransmit an error part of the third transmission frame. The second transmission frame is a 1st transmission frame that is after a reference transmission frame on the second link and that has a same type as the reference transmission frame. An end moment of the reference transmission frame is the same as an end moment of the third transmission frame. In this solution, in a scenario in which the third transmission frame fails to be transmitted, the first transmission frame is used to retransmit the error part of the third transmission frame, and that the transmit MLD sends the first transmission frame on the first link may be understood as error recovery on the first link. In this way, synchronous transmission on multiple links during error recovery can be implemented according to this solution.

In some possible designs, if the second moment is earlier than the third moment, and the first link is idle between the second moment and the third moment, the first moment is the third moment. In other words, the moment at which the backoff counter of the first link decreases to 0 is earlier than the sending moment of the second transmission frame on the second link, and the first link is idle between the moment at which the backoff counter decreases to 0 and the sending moment of the second transmission frame. In this case, a sending moment of the first transmission frame is the same as the sending moment of the second transmission frame, or a start time of the first transmission frame is aligned with a start time of the second transmission frame. Certainly, an end time of the first transmission frame is also aligned with an end time of the second transmission frame.

In some possible designs, if the second moment is later than the third moment and earlier than a fourth moment, the first moment is the second moment. The fourth moment is an end moment of the second transmission frame. In other words, the moment at which the backoff counter of the first link decreases to 0 is later than the sending moment of the second transmission frame on the second link, and earlier than the end moment of the second transmission frame. In this case, a sending moment of the first transmission frame is the moment at which the backoff counter of the first link decreases to 0, and an end moment of the first transmission frame is the same as the end moment of the second transmission frame.

In some possible designs, if the second moment is later than the third moment and earlier than the fourth moment, and duration between the second moment and the fourth moment is greater than or equal to first duration, the first moment is the second moment. The possible design may avoid a problem that the end time of the first transmission frame cannot be aligned with the end time of the second transmission frame because the duration between the second moment and the fourth moment is very short.

In some possible designs, if the second moment is later than the third moment and earlier than a fourth moment, the first moment is a sending moment of a fourth transmission frame on the second link. The fourth moment is an end moment of the second transmission frame. The fourth transmission frame is a 1st transmission frame that is after the second transmission frame and that has a same type as the second transmission frame. In other words, the moment at which the backoff counter of the first link decreases to 0 is later than the sending moment of the second transmission frame on the second link and earlier than the end moment of the second transmission frame. In addition, the first link is idle between the moment at which the backoff counter decreases to 0 and the sending moment of the fourth transmission frame. In this case, a sending moment of the first transmission frame is the same as the sending moment of the fourth transmission frame, or a start time of the first transmission frame is aligned with a start time of the fourth transmission frame. Certainly, an end time of the first transmission frame is also aligned with an end time of the fourth transmission frame.

In some possible designs, if the second moment is later than the third moment and earlier than the fourth moment, and duration between the second moment and the fourth moment is less than or equal to second duration, the first moment is the sending moment of the fourth transmission frame on the second link. The possible design may avoid a problem that the end time of the first transmission frame cannot be aligned with an end time of the second transmission frame because the duration between the second moment and the fourth moment is very short.

In some possible designs, the first transmission frame is an uplink trigger frame, and the third transmission frame is an uplink trigger frame.

In some possible designs, when the second transmission frame is an uplink trigger frame, if the second moment is later than a fourth moment and earlier than a fifth moment, the first moment is the fifth moment. The fourth moment is an end moment of the second transmission frame, the fifth moment is a sending moment of a fourth transmission frame on the second link, and the fourth transmission frame is a 1st uplink trigger frame after the second transmission frame. In other words, the backoff counter of the first link decreases to 0 after the end moment of the second transmission frame and before the sending moment of the fourth transmission frame. In addition, the first link is idle between the moment at which the backoff counter decreases to 0 and the sending moment of the fourth transmission frame. In this case, a sending moment of the first transmission frame is the same as the sending moment of the fourth transmission frame, or a start time of the first transmission frame is aligned with a start time of the fourth transmission frame. Certainly, an end time of the first transmission frame is also aligned with an end time of the fourth transmission frame.

According to a second aspect, a multi-link synchronous transmission method is provided. Multiple links between a transmit MLD and a receive MLD include a first link. One of the transmit MLD and the receive MLD has a simultaneous transmit and receive STR capability, and the other does not have the STR capability. The method includes: The transmit MLD sends a first physical layer protocol data unit PPDU to the receive MLD at a first moment on the first link when a first condition is met. The first PPDU is used to retransmit a portion of or all information of a second PPDU on the first link. The first condition includes: (1) A response frame of the second PPDU fails to be received; and (2) An interval between a first moment and a second moment is a short interframe space, an energy detection result between the first moment and the second moment is less than or equal to a first threshold, and third duration is between the second moment and a predicted end moment of the response frame of the second PPDU.

According to this solution, after an error occurs in the response frame of the second PPDU on the first link, the transmit MLD may start to perform energy detection on the first link at the predicted end moment of the response frame. If an energy detection result is less than or equal to the first threshold in the SIFS, it is considered that the link is idle, and the first PPDU is sent after the SIFS from the predicted end moment of the response frame, to retransmit the second PPDU. Normally, an interval between two adjacent frames on a second link is an SIFS. After error recovery on the first link, an interval between the response frame of the second PPDU and the first PPDU is also an SIFS. In this way, start times of the first PPDU and a PPDU on the second link may be aligned, and end times of the first PPDU and the PPDU on the second link may be aligned, to implement synchronous transmission on multiple links, reduce interference between the multiple links, and improve transmission performance.

In some possible designs, the first threshold is lower than a second threshold, and the second threshold is an energy detection threshold in the 802.11ax standard.

According to a third aspect, a transmit multi-link device MLD is provided. Links between the transmit multi-link device MLD and a receive MLD include a first link and a second link, and the transmit MLD includes a processing module and a transceiver module.

The processing module is configured to determine that a first condition is met. The first condition includes: (1) A backoff counter of the first link is 0, and (2) A second transmission frame is located in a transmission opportunity TXOP on the second link.

The transceiver module is configured to send a first transmission frame to the receive MLD at a first moment on the first link when the first condition is met. The first moment is determined based on a second moment and/or a third moment, the second moment is a moment at which the backoff counter of the first link decreases to 0, and the third moment is a sending moment of the second transmission frame on the second link.

The multi-link MLD provided in the third aspect is used to perform any of the first aspect or the possible implementations of the first aspect. For specific details, refer to any of the first aspect or the possible implementations of the first aspect. Details are not described herein again.

According to a fourth aspect, a transmit multi-link device MLD is provided. Multiple links between the transmit multi-link device MLD and a receive MLD include a first link, and the transmit MLD includes a processing module and a transceiver module.

The processing module is configured to determine that a first condition is met. The first condition includes: (1) A response frame of a second PPDU fails to be received; and (2) An interval between a first moment and a second moment is a short interframe space, an energy detection result between the first moment and the second moment is less than or equal to a first threshold, and third duration is between the second moment and a predicted end moment of the response frame of the second PPDU.

The transceiver module is configured to send a first PPDU to the receive MLD at the first moment on the first link when the first condition is met. The first PPDU is used to retransmit a portion of or all information of the second PPDU on the first link.

The multi-link MLD provided in the fourth aspect is used to perform any of the second aspect or the possible implementations of the second aspect. For specific details, refer to any of the second aspect or the possible implementations of the second aspect. Details are not described herein again.

According to a fifth aspect, a transmit multi-link device MLD is provided. Links between the transmit multi-link device MLD and a receive MLD include a first link and a second link, and the transmit multi-link device MLD includes a processor and a transceiver that is internally connected to and communicates with the processor.

The processor is configured to determine that a first condition is met. The first condition includes: (1) A response frame of a second PPDU fails to be received; and (2) An interval between a first moment and a second moment is a short interframe space, an energy detection result between the first moment and the second moment is less than or equal to a first threshold, and third duration is between the second moment and a predicted end moment of the response frame of the second PPDU.

The transceiver is configured to send a first transmission frame to the receive MLD at the first moment on the first link when the first condition is met. The first moment is determined based on the second moment and/or a third moment, the second moment is a moment at which a backoff counter of the first link decreases to 0, and the third moment is a sending moment of a second transmission frame on the second link.

The multi-link MLD provided in the fifth aspect is used to perform any of the first aspect or the possible implementations of the first aspect. For specific details, refer to any of the first aspect or the possible implementations of the first aspect. Details are not described herein again.

According to a sixth aspect, a transmit multi-link device MLD is provided. Multiple links between the transmit multi-link device MLD and a receive MLD include a first link, and the transmit multi-link device MLD includes a processor and a transceiver that is internally connected to and communicates with the processor.

The processor is configured to determine that a first condition is met. The first condition includes: (1) A backoff counter of the first link is 0, and (2) A second transmission frame is located in a transmission opportunity TXOP on a second link.

The transceiver is configured to send a first PPDU to the receive MLD at a first moment on the first link when the first condition is met. The first PPDU is used to retransmit a portion of or all information of a second PPDU on the first link.

The multi-link MLD provided in the sixth aspect is used to perform any of the second aspect or the possible implementations of the second aspect. For specific details, refer to any of the second aspect or the possible implementations of the second aspect. Details are not described herein again.

According to a seventh aspect, a transmit multi-link device MLD is provided. Links between the transmit multi-link device MLD and a receive MLD include a first link and a second link, and the transmit multi-link device MLD includes a processing circuit and an output interface that is internally connected to and communicates with the processing circuit.

The processing circuit is configured to determine that a first condition is met. The first condition includes: (1) A response frame of a second PPDU fails to be received; and (2) An interval between a first moment and a second moment is a short interframe space, an energy detection result between the first moment and the second moment is less than or equal to a first threshold, and third duration is between the second moment and a predicted end moment of the response frame of the second PPDU.

The output interface is configured to send a first transmission frame to the receive MLD at the first moment on the first link when the first condition is met. The first moment is determined based on the second moment and/or a third moment, the second moment is a moment at which a backoff counter of the first link decreases to 0, and the third moment is a sending moment of a second transmission frame on the second link.

The multi-link MLD provided in the seventh aspect is used to perform any of the first aspect or the possible implementations of the first aspect. For specific details, refer to any of the first aspect or the possible implementations of the first aspect. Details are not described herein again.

According to an eighth aspect, a transmit multi-link device MLD is provided. Multiple links between the transmit multi-link device MLD and a receive MLD include a first link, and the transmit multi-link device MLD includes a processing circuit and an output interface that is internally connected to and communicates with the processing circuit.

The processing circuit is configured to determine that a first condition is met. The first condition includes: (1) A backoff counter of the first link is 0, and (2) A second transmission frame is located in a transmission opportunity TXOP on a second link.

The output interface is configured to send a first PPDU to the receive MLD at a first moment on the first link when the first condition is met. The first PPDU is used to retransmit a portion of or all information of a second PPDU on the first link.

The multi-link MLD provided in the eighth aspect is used to perform any of the second aspect or the possible implementations of the second aspect. For specific details, refer to any of the second aspect or the possible implementations of the second aspect. Details are not described herein again.

According to a ninth aspect, an embodiment of this application provides a computer-readable storage medium, configured to store a computer program. The computer program includes instructions used to perform any one of the first aspect or the possible implementations of the first aspect.

According to a tenth aspect, an embodiment of this application provides a computer-readable storage medium, configured to store a computer program. The computer program includes instructions used to perform any one of the second aspect or the possible implementations of the second aspect.

According to an eleventh aspect, an embodiment of this application provides a computer program. The computer program includes instructions used to perform any one of the first aspect or the possible implementations of the first aspect.

According to a twelfth aspect, an embodiment of this application provides a computer program. The computer program includes instructions used to perform any one of the second aspect or the possible implementations of the second aspect.

According to a thirteenth aspect, an embodiment of this application provides a communication system. The communication system includes the transmit MLD provided in the third aspect, the fifth aspect, or the seventh aspect and a receive MLD.

According to a fourteenth aspect, an embodiment of this application provides a communication system. The communication system includes the transmit MLD provided in the fourth aspect, the sixth aspect, or the eighth aspect and a receive MLD.

DESCRIPTION OF EMBODIMENTS

Figure 1A:
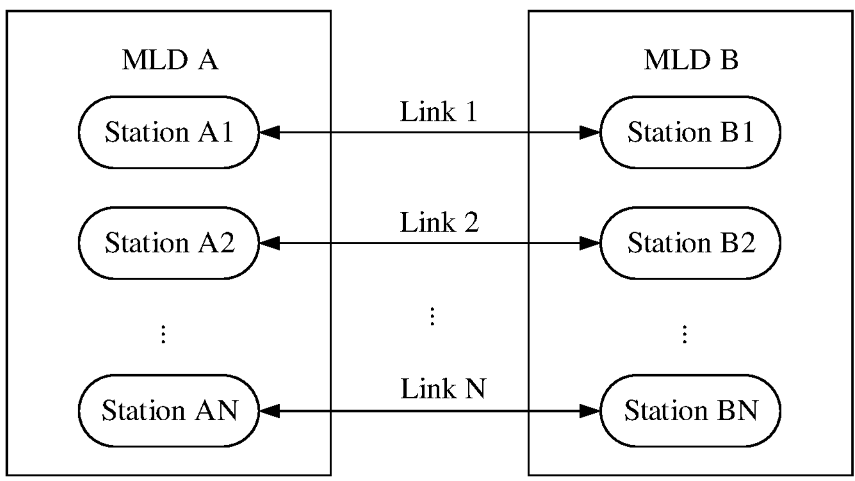
FIG. 1*a* is a schematic diagram of links between multi-link devices MLDs according to an embodiment of this application.

In the descriptions of this application, "/" indicates an "or" relationship between associated objects unless otherwise specified. For example, AB may represent A or B. "And/or" in this application is merely an association relationship for describing associated objects, and represents that three relationships may exist. For example, A and/or B may represent the following three cases: Only A exists, both A and B exist, and only B exists, where A and B each may be singular or plural. In addition, in descriptions of this application, unless otherwise specified, "multiple" means two or more than two. "At least one of the following items (pieces)" or a similar expression thereof means any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural.

In addition, to clearly describe the technical solutions in embodiments of this application, terms such as "first" and "second" are used in embodiments of this application to distinguish between same items or similar items whose functions and purposes are basically the same. A person skilled in the art may understand that the terms such as "first" and "second" do not limit a quantity and an execution sequence, and the terms such as "first" and "second" do not indicate a definite difference.

It should be noted that in this application, the word such as "example" or "for example" is used to indicate giving an example, an illustration, or a description. Any embodiment or design solution described by using "example" or "for example" in this application shall not be construed as being more preferred or more advantageous than another embodiment or design solution. Exactly, use of the word such as "example" or "for example" is intended to present a related concept in a specific manner.

For ease of understanding, the following first briefly describes technical terms or related technologies in embodiments of this application.

1. Multi-Link Device (Multi-Link Device, MLD):

The MLD has a capability of transmitting and receiving in multiple frequency bands. Compared with a device that supports only single-link transmission, the multi-link device has higher transmission efficiency and higher throughput. For example, the multiple frequency bands include but are not limited to a 2.4 GHz frequency band, a 5 GHz frequency band, and a 6 GHz frequency band.

A spatial path through which the MLD performs data transmission in one frequency band may be referred to as one link. In other words, the MLD supports multi-link communication, and each link supported by the MLD corresponds to one frequency band. Optionally, one frequency band may include one or more channels.

It should be noted that, in this application, the MLD may also be referred to as a multi-band device (multi-band device), and the two may be replaced with each other. This is not specifically limited in embodiments of this application.

In this application, the MLD includes at least two affiliated (affiliated) stations (stations, STAs), namely, affiliated STAs. The affiliated station may be an access point station (access point station, AP STA) or a non-access point station (non-access point station, non-AP STA). The AP STA may also be referred to as an AP for short.

For ease of description, a multi-link device whose affiliated station is an AP STA is referred to as an AP multi-link device (AP multi-link device, AP MLD), and a multi-link device whose affiliated station is a non-AP STA is referred to as a STA multi-link device (STA multi-link device, STA MLD) in this application.

It should be noted that the AP MLD may also be referred to as a multi-link AP or a multi-link AP device. The STA MLD may also be referred to as a multi-link STA, a multi-link STA device, or a non-AP multi-link device (non-AP MLD). The names may be replaced with each other. This is not specifically limited in embodiments of this application. Certainly, the AP MLD or the STA MLD may also have another name.

Optionally, the non-AP STA may implement a function of the AP STA, or the non-AP STA can be operated as the AP STA. An MLD formed by a non-AP STA that may implement the function of the AP STA or a non-AP STA that can be operated as the AP STA may be referred to as a soft AP MLD (soft AP MLD).

In this application, each affiliated station in the MLD may establish one link for communication. FIG. 1*a* uses an example in which an MLD A includes a station A1 to a station AN and an MLD B includes a station B1 to a station BN. The station A1 communicates with the station B1 on a link 1, a station A2 communicates with a station B2 on a link 2, and so on. The station AN communicates with the station BN on a link N.

In addition, the MLD in this application may be classified into an STR MLD and a non-STR MLD. The STR MLD has an STR capability, and the non-STR MLD does not have the STR capability.

It may be understood that the STR MLD may include an STR AP MLD or an STR STA MLD, and the non-STR MLD may include a non-STR AP MLD or a non-STR STA MLD.

Optionally, the non-STRAP MLD may include the soft AP MLD. Certainly, the non-STR AP MLD is not limited to the soft AP MLD.

Optionally, the AP STA in this application may be an access point used by a mobile subscriber to access a wired network, and is mainly deployed in a home, inside a building, and inside a campus, with a typical coverage radius of tens of meters to hundreds of meters. Certainly, the AP STA may alternatively be deployed outdoors. The AP STA is equivalent to a bridge that connects a wired network and a wireless network. A main function of the AP STA is to connect wireless network clients together, and then connect the wireless network to the Ethernet. Specifically, the AP STA may be a terminal device or a network device having a wireless fidelity (wireless fidelity, Wi-Fi) chip. The AP STA may be a device that supports the 802.11be standard. Alternatively, the AP STA may be a device that supports multiple wireless local area network (wireless local area network, WLAN) standards such as 802.11ax, 802.11ac, 802.11n, 802.11g, 802.11b, and 802.11a.

Optionally, the non-AP STA in this application may be a wireless communication chip, a wireless sensor, or a wireless communication terminal. For example, the non-AP STA may be a mobile phone that supports a Wi-Fi communication function, a tablet computer that supports a Wi-Fi communication function, a set-top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. The non-AP STA may support the 802.11be standard. Alternatively, the non-AP STA may support multiple WLAN standards such as 802.11ax, 802.11ac, 802.11n, 802.11g, 802.11b, and 802.11a.

2. Uplink Transmission and Downlink Transmission:

In this application, downlink transmission means that a data sender is an AP MLD, and a data receiver is a STA MLD. Uplink transmission means that a data sender is a STA MLD, and a data receiver is an AP MLD.

In uplink and downlink transmission, data may be carried by a physical layer protocol data unit (physical layer protocol data unit, PPDU). After receiving the PPDU, the data receiver may send a response frame to the data sender, to feed back whether the PPDU is successfully received.

Optionally, the response frame may be a block acknowledgement (block acknowledgement, BA) or an acknowledgement (acknowledgement, ACK). The BA may be used to feed back whether a PPDU including multiple media access control protocol data units (media access control protocol data units, MPDUs) is successfully transmitted, and the ACK may be used to feed back whether a PPDU including a single MPDU is successfully transmitted. A start part (or a frame header) of the response frame includes a physical layer start sending indication (PHY-RXSTART.indication) of the response frame. The following embodiments of this application are described by using an example in which the response frame is a BA.

It should be noted that the response frame in this application may also be referred to as a reply frame, and the two may be replaced with each other. This is not specifically limited in this application.

In addition, there is an uplink trigger frame (Trigger)-based uplink transmission mechanism in the uplink transmission. In this mechanism, after obtaining a channel of a link through contention, the AP MLD sends an uplink trigger frame to the STA MLD, to trigger the STA MLD to send uplink data. After receiving the uplink data, the AP MLD sends a response frame to the STA MLD. In this mechanism, the data sent by the STA MLD may be carried by a trigger-based PPDU (trigger based physical protocol data unit, TB PPDU).

Figure 1B:
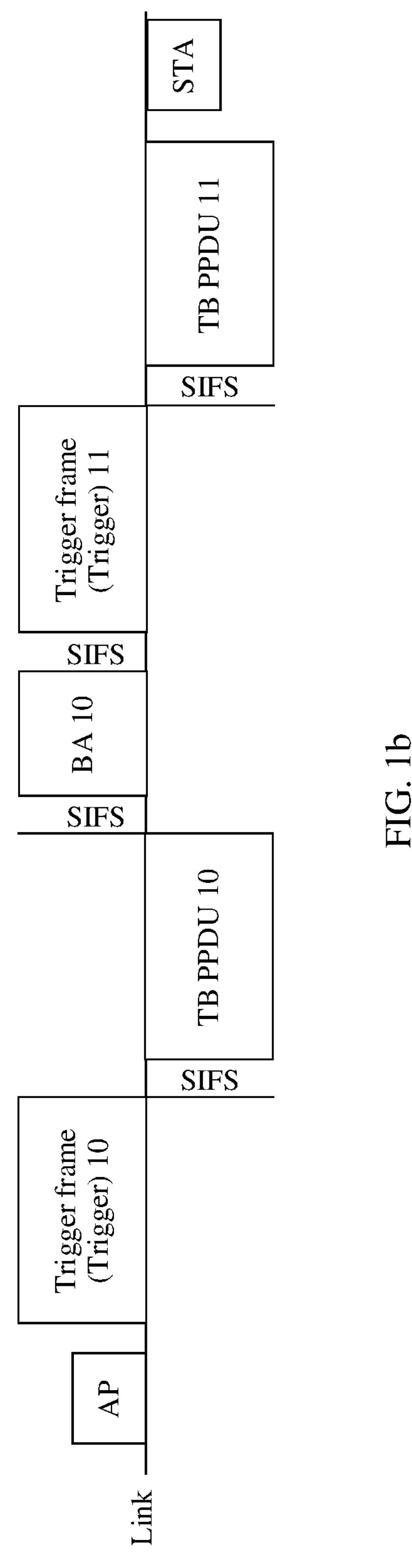
FIG. 1*b* is a schematic diagram of uplink trigger frame-based transmission according to an embodiment of this application.

An uplink trigger frame-based uplink transmission mechanism on a single link is used as an example. As shown in FIG. 1B, the AP MLD sends a trigger 10 to the STA MLD, and the STA MLD sends a TB PPDU 10 to the AP MLD after receiving the trigger 10. Then, the AP MLD sends a BA 10 to feed back whether the TB PPDU 10 is successfully transmitted. It is assumed that the TB PPDU 10 is successfully transmitted, and the AP MLD continues to send a trigger 20 after a short interframe space (short interframe space, SIFS). The rest may be deduced by analogy.

Figure 1C:
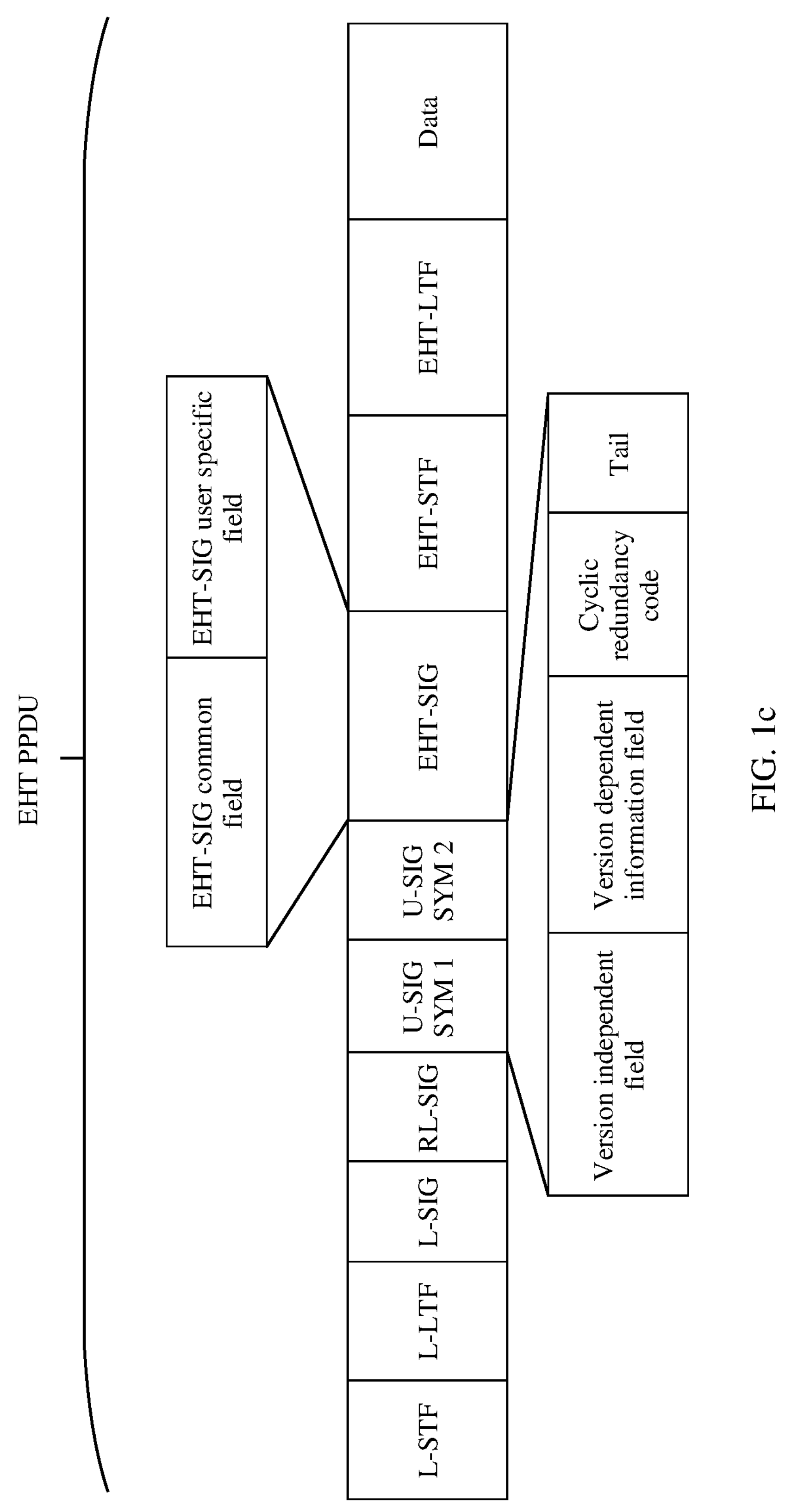
FIG. 1*c* is a schematic diagram of a structure of a PPDU according to an embodiment of this application.

3. PPDU:

FIG. 1*c* shows a structure of an extremely high throughput (extremely high throughput, EHT) PPDU that may be used in 802.11be. The EHT PPDU may include three parts: a legacy preamble (legacy preamble, L-preamble), a high efficiency preamble (high efficiency preamble, HE-preamble), and a physical layer convergence protocol service data unit (physical layer convergence protocol service data unit, PSDU).

The L-preamble includes a legacy-short training field (legacy-short training field, L-STF), a legacy-long training field (legacy-long training field, L-LTF), and a legacy-signal field (legacy-signal field, L-SIG). The HE-preamble includes a repeated legacy-signal field (repeated legacy-signal field, RL-SIG), a universal (universal SIG, U-SIG) field, an extremely high throughput signaling (EHT-SIG) field, an extremely high throughput short training (extremely high throughput short training, EHT-STF) field, and an extremely high throughput long training (extremely high throughput long training, EHT-LTF) field. The PSDU includes a data (data) field and another field. The U-SIG field occupies two OFDM symbols, such as U-SIG SYM 1 and U-SIG SYM 1 shown in FIG. 1*c*. The universal (U-SIG) field may include a version independent information (version independent info) field, a version dependent information (version dependent info) field, a cyclic redundancy check (cyclic redundancy check, CRC) field, and a tail field. The version independent info field may include a Wi-Fi version field of 3 bits, a downlink/uplink field of 1 bit, a BSS color field of at least 6 bits, and a transmission opportunity (transmission opportunity, TXOP) field of at least 7 bits. Further, the version independent info field may further include a bandwidth field. The version dependent info field may include a PPDU format field and the like, and may further include one or more of a modulation and coding scheme field, a spatial flow field, an encoding field, and the like. The CRC field occupies at least 4 bits, and the tail field occupies at least 6 bits of the tail bit field.

In a possible implementation, the EHT-SIG field includes an EHT-SIG common field and an EHT-SIG user specific field. The EHT-SIG common field may be used to carry resource allocation information allocated to a STA, and the EHT-SIG user specific field may be used to carry user information.

It should be understood that the EHT-PPDU is merely an example. In a standard formulation process or a technical development process, there may be another structure. This is not limited in this application.

4. Transmission Opportunity (Transmission Opportunity, TXOP):

The TXOP is a basic unit in wireless channel access. The TXOP includes an initial time and maximum duration (TXOP limit). In the TXOP limit, a station that obtains the TXOP may not perform channel contention again, and continuously use a channel to transmit multiple data frames.

After sending a frame, the device needs to wait for a very short period of time before sending a next frame, to avoid a collision. This period of time is generally referred to as an interframe space (interframe space, IFS). Currently, the interframe space is usually a short interframe space (short interframe space, SIFS).

Figure 1D:
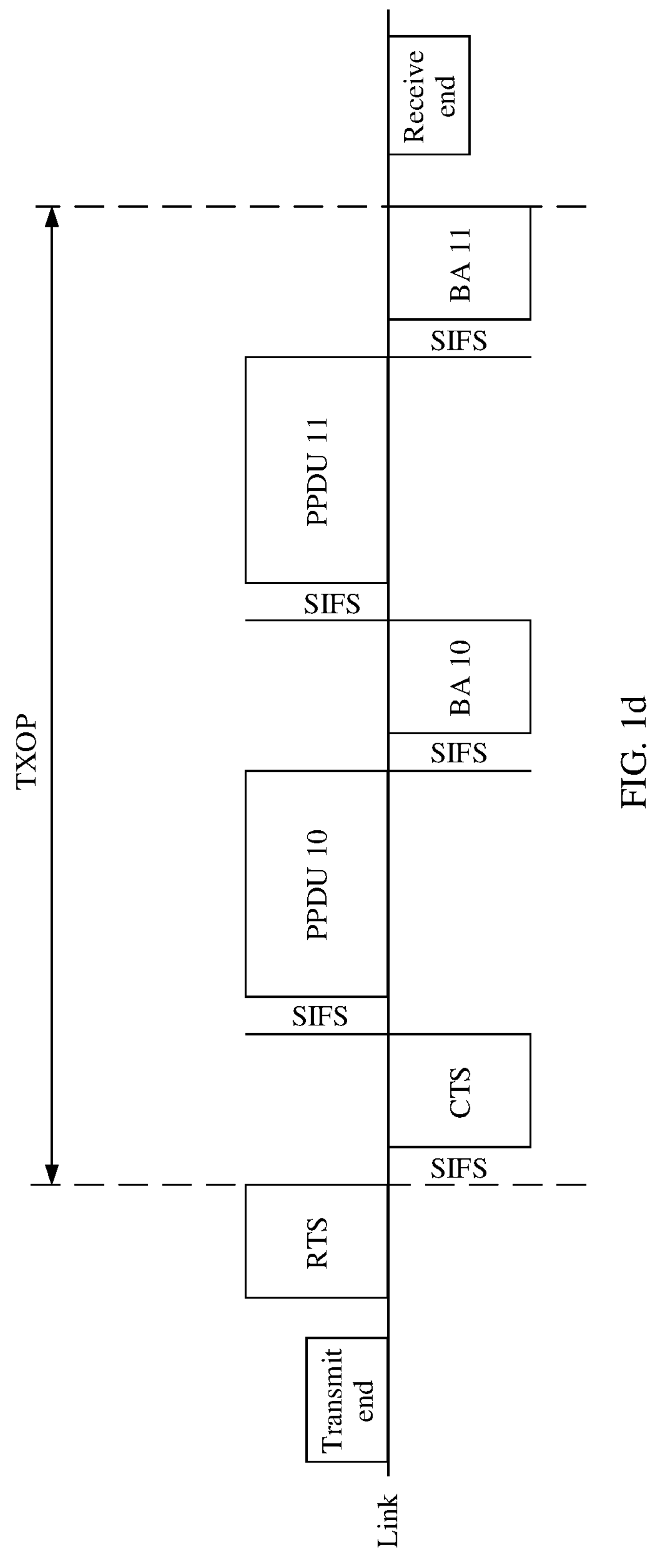
FIG. 1*d* is a schematic diagram of a structure of a transmission opportunity TXOP according to an embodiment of this application.

For example, the interframe space is the SIFS. FIG. 1*d* is a schematic diagram of normal transmission of a PPDU in a TXOP. A transmit end device receives a clear to send (clear to send, CTS) frame, and after an SIFS, the transmit end device starts to send a PPDU 10. Still after the SIFS, the transmit end device receives a BA 10 from a receive end device. The BA 10 is used to feed back to the transmit end whether the PPDU 10 is successfully transmitted. It is assumed that the PPDU 10 is successfully transmitted. The BA 10 frame ends, and after the SIFS the transmit end device continues to send a PPDU 11. The rest may be deduced by analogy.

RTS in FIG. 1*d* is a request to send (request to send, RTS). RTS/CTS is used to solve a hidden site, to avoid a signal collision between multiple sites. Before sending a data frame, the transmit end first sends an RTS frame in a broadcast manner, to indicate that the transmit end is to send a data frame to a specified receive end in specified duration. After receiving the RTS frame, the receive end sends a CTS frame in a broadcast manner to acknowledge transmission performed by the transmit end. Another station that receives the RTS frame or the CTS frame do not send a radio frame until the specified duration ends.

5. Error Recovery (Error Recovery):

After a transmission opportunity (transmission opportunity, TXOP) is successfully established, when a PPDU in the TXOP fails to be transmitted, error recovery of a link is triggered.

The error recovery includes point coordination function interframe space (point coordination function interframe space, PIFS) error recovery and backoff (backoff) error recovery. They are separately described below.

(1) PIFS error recovery: After idle duration of a channel reaches the PIFS, a device sends a next PPDU through the channel.

The PIFS when the channel is idle is waited, and then the next PPDU is sent. This is referred to as the PIFS error recovery.

(2) Backoff error recovery: Channel backoff is performed, and a next PPDU is sent after the backoff ends.

The IEEE 802.11 standard allows multiple users to share a same transmission medium. A transmit end checks availability of the transmission medium before sending data. The IEEE 802.11 standard uses carrier sense multiple access with collision avoidance (carrier sense multiple access with collision avoidance, CSMA/CA) to implement channel contention. The CSMA/CA adopts a backoff mechanism to avoid collision.

The backoff mechanism through a single channel is described below. Before a device sends a message, the device may select a random number from 0 to a contention window (contention window, CW), and use the random number as an initial value of a backoff counter. After an idle time of the channel reaches an arbitration interframe space (arbitration interframe space, AIFS), a count value of the backoff counter decreases by 1 each time the channel is idle for one timeslot (timeslot). Before the count value of the backoff counter decreases to 0, if the channel is busy in one timeslot, the backoff counter stops counting. Then, if the channel changes from a busy state to an idle state, and the idle time of the channel reaches the AIFS, the backoff counter resumes counting. When the count value of the backoff counter is 0, a backoff procedure ends, and the device may start data transmission.

Figures 2, 3, 4:
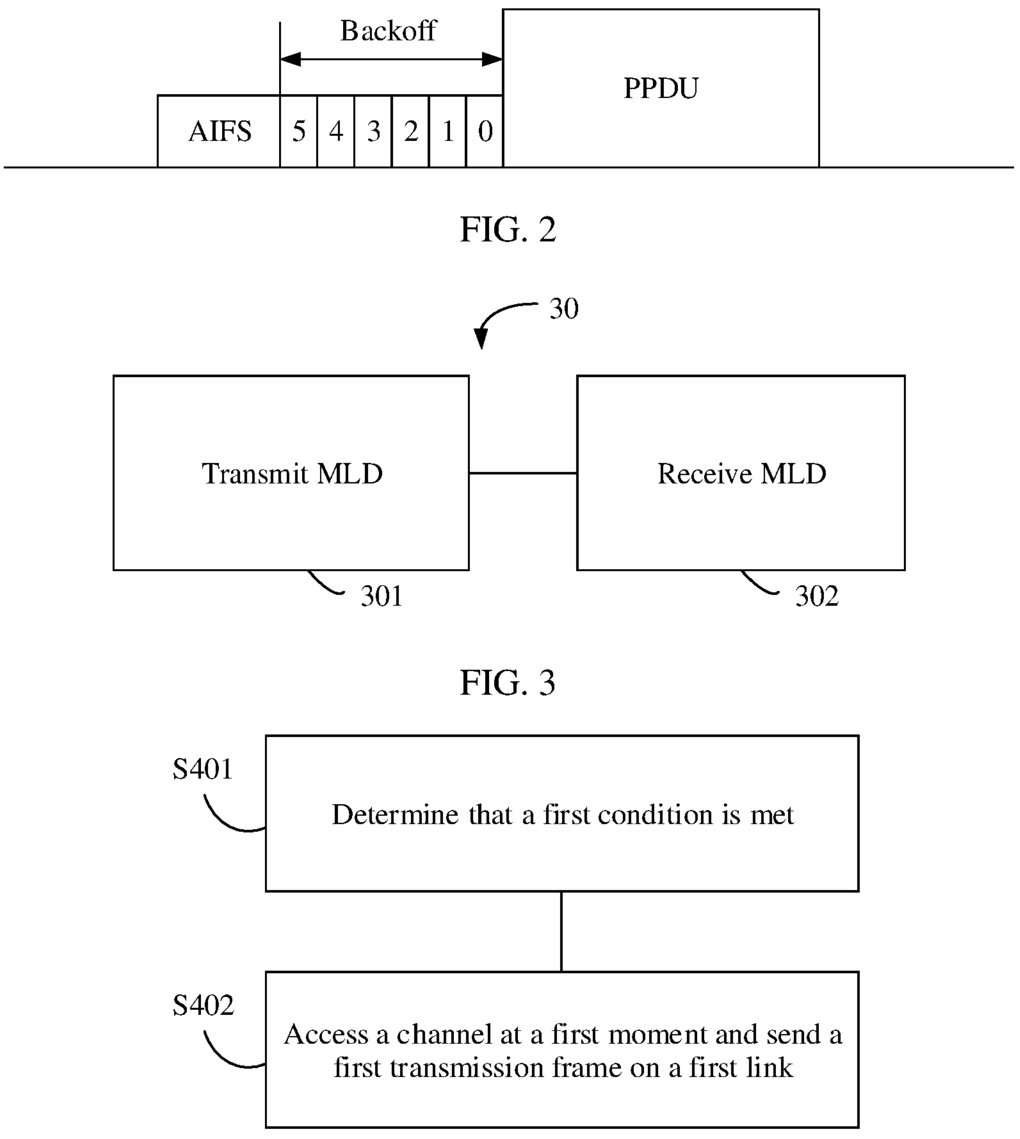
FIG. 2 is a schematic flowchart of a backoff mechanism according to an embodiment of this application.
FIG. 3 is a schematic diagram of an architecture of a communication system according to an embodiment of this application.
FIG. 4 is a schematic flowchart of a multi-link synchronous transmission method according to an embodiment of this application.

With reference to FIG. 2, it is assumed that the initial value of the backoff counter is 5, and after the idle time of the channel reaches the AIFS, the backoff counter starts to roll back. Each time the channel is in an idle state in one timeslot, the count value of the backoff counter decreases by 1 until the count value of the backoff counter is 0. After the count value of the backoff counter is 0, the device successfully obtains the channel through contention, and the device may send a PPDU through the channel.

6. Transmission Frame Synchronization:

In this application, the transmission frame synchronization may mean that end times of transmission frames sent by a transmit end to a receive end on multiple links are aligned. Alternatively, start times of the transmission frames sent by the transmit end to the receive end on the multiple links are aligned, and the end times of the transmission frames sent by the transmit end to the receive end on the multiple links are aligned.

The following describes a communication system provided in an embodiment of this application. FIG. 3 is a schematic diagram of a structure of a communication system 30 according to an embodiment of this application. The communication system 30 includes a transmit MLD 301 and a receive MLD 302.

One of the transmit MLD 301 and the receive MLD 302 has an STR capability, and the other does not have the STR capability. In other words, one is an STR MLD, and the other is a non-STR MLD. For example, the transmit MLD 301 is the STR MLD, and the receive MLD 302 is the non-STR MLD. Alternatively, the transmit MLD 301 is the non-STR MLD, and the receive MLD 302 is the STR MLD. This is not specifically limited in this application.

Multiple links are supported between the transmit MLD 301 and the receive MLD 302. The following embodiments of this application are described by using an example in which the multiple links between the transmit MLD 310 and the receive MLD 320 include a first link and a second link.

With reference to the accompanying drawings of the specification, the following describes a link synchronization method according to an embodiment of this application by using an example in which the transmit MLD 301 interacts with the receive MLD 302 shown in FIG. 3.

It may be understood that, in embodiments of this application, the transmit MLD 301 and/or the receive MLD 302 may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all operations in embodiments of this application may be performed.

It should be noted that, in the following embodiments of this application, names of messages between devices or functions, names of parameters in messages, or the like are merely examples, and there may be other names in specific implementation. This is not specifically limited in embodiments of this application.

The method may be performed by a transmit MLD or a component (for example, a chip) that may be used in the transmit MLD. In this application, an example in which the method is performed by the transmit MLD is used for description. In addition, in the method, links between the transmit MLD and a receive MLD include a first link and a second link, one of the transmit MLD and the receive MLD has an STR capability, and the other does not have the STR capability. In other words, one is an STR MLD, and the other is a non-STR MLD.

FIG. 4 is a schematic flowchart of the multi-link synchronous transmission method. The multi-link synchronous transmission method includes the following steps.

S401: A transmit MLD determines that a first condition is met.

The first condition includes: (1) A backoff counter of a first link is 0, and (2) A second transmission frame is located in a TXOP on a second link.

In other words, in this application, the transmit MLD performs a backoff procedure on the first link to contend for a channel. If the TXOP is successfully established on the second link, the transmit MLD may not contend for a channel again, and continue to use the channel obtained through contention in the TXOP.

Optionally, a trigger condition for performing the backoff procedure on the first link and a backoff start moment are not specifically limited in this application.

S402: The transmit MLD sends a first transmission frame to a receive MLD at a first moment on the first link. Correspondingly, the receive MLD receives the first transmission frame from the transmit MLD on the first link.

The first moment is determined based on a second moment and/or a third moment. The second moment is a moment at which the backoff counter of the first link decreases to 0. The third moment is a sending moment of the second transmission frame on the second link.

In other words, the solution of this application may be: The transmit MLD sends the first transmission frame to the receive MLD at the first moment on the first link when the first condition is met.

Optionally, when the transmit MLD sends the first transmission frame on the first link, the transmit MLD has accessed a channel of the first link. A moment at which the transmit MLD accesses the channel of the first link is not specifically limited in this application.

Optionally, a sending moment of a transmission frame may alternatively be understood as a start moment or a start time of the transmission frame, and they may be replaced with each other. This is not specifically limited in this application.

Optionally, a type of a transmission frame in this embodiment includes but is not limited to a data frame or an uplink trigger frame. A type of the first transmission frame is the same as a type of the second transmission frame.

Optionally, sending a transmission frame on a link may be understood as sending the transmission frame through a channel of the link. The two may be replaced with each other. This is not specifically limited in this application.

Optionally, after receiving the first transmission frame, the receive MLD may send a response frame of the first transmission frame to the transmit MLD, or may perform service processing based on the first transmission frame. This is not specifically limited in embodiments of this application.

According to this solution, when the backoff counter of the first link decreases to 0, the channel of the first link may be accessed for transmission, and the second transmission frame may be sent in the TXOP on the second link through the channel obtained through contention. In this case, the transmit MLD may determine, based on the moment at which the backoff counter decreases to 0 and the sending moment of the second transmission frame on the second link, a moment at which the first transmission frame is sent on the first link. An end time of a transmission frame sent on the first link is aligned as much as possible with an end time of a transmission frame sent on the second link. Alternatively, a start time and the end time of the transmission frame sent on the first link are aligned with a start time and the end time of the transmission frame sent on the second link respectively. This implements synchronous transmission on multiple links, reduces interference between the multiple links, and improves transmission performance.

In an implementation scenario of this application, the first condition may further include: A third transmission frame on the first link fails to be transmitted. In this case, the first transmission frame may be used to retransmit an error part of the third transmission frame.

It should be noted that, in this application, an example in which no error occurs during transmission in the TXOP on the second link in this scenario, that is, transmission in the TXOP on the second link is normal transmission is used for description.

In this scenario, an end time of a reference transmission frame on the second link is the same as an end time of the third transmission frame. Optionally, a start time of the reference transmission frame is the same as a start time of the third transmission frame. The reference transmission frame is a transmission frame that is transmitted before and closest to the second transmission frame and that has a same type as the second transmission frame. In other words, the second transmission frame is a 1st transmission frame that is after the reference transmission frame on the second link and has a same type as the reference transmission frame, and the end moment of the reference transmission frame is the same as the end moment of the third transmission frame.

Optionally, in this scenario, the backoff procedure on the first link may be triggered by a transmission failure of the third transmission frame, that is, the transmission failure of the third transmission frame is a trigger condition of the backoff procedure on the first link. In other words, after determining that the third transmission frame fails to be transmitted, the transmit MLD performs the backoff procedure on the first link. Finally, the step S402 is performed when the first condition is met.

Optionally, when the transmission frame is a PPDU, that the transmit MLD determines that a third PPDU (namely, the third transmission frame) fails to be transmitted may include: In an acknowledgement timeout (ACKTimeOut) time starting from an end moment (PHY-TXEnd) of the third PPDU, or in an ACKTimeOut time starting from a transmit end moment (PHY-TXEnd) at which the transmit MLD sends the third PPDU, if the transmit MLD does not receive a response frame of the third PPDU, or if the transmit MLD does not receive a PHY-RXSTART.indication of the response frame of the third PPDU, the transmit MLD determines that the third PPDU fails to be transmitted. The ACKTimeOut time includes one SIFS, one timeslot (SlotTime), and one sending delay (RxPHYStartDelay).

When the transmission frame is an uplink trigger frame, that the transmit MLD determines that a third uplink trigger frame (namely, the third transmission frame) fails to be transmitted may include: In an ACKTimeOut time starting from an end moment (PHY-TXEnd) of the third uplink trigger frame, or in an ACKTimeOut time starting from a transmit end moment (PHY-TXEnd) at which the transmit MLD sends the third PPDU, if the transmit MLD does not receive a TB PPDU corresponding to the third uplink trigger frame, or if the transmit MLD does not receive a PHY-RXSTART.indication of the TB PPDU corresponding to the third uplink trigger frame, the transmit MLD determines that the third uplink trigger frame fails to be transmitted.

Optionally, that the third transmission frame fails to be transmitted may include: Some or all content of the third transmission frame fails to be transmitted. That the first transmission frame is used to retransmit an error part of the third transmission frame may include: The first transmission frame includes the error part of the third transmission frame. Alternatively, the first transmission frame includes the error part and some or all of an error-free part of the third transmission frame, that is, the first transmission frame may retransmit the entire third transmission frame.

In this solution, in a scenario in which the third transmission frame fails to be transmitted, the first transmission frame is used to retransmit the error part of the third transmission frame, and that the transmit MLD sends the first transmission frame on the first link may be understood as error recovery on the first link. In this way, synchronous transmission on multiple links during error recovery can be implemented according to this solution.

The following describes in detail the first moment in a scenario in which the third transmission frame fails to be transmitted. The first moment determined based on the second moment and/or the third moment may vary with different implementation scenarios of embodiments of this application.

First, the solution of this application is described by using a PPDU as a transmission frame. In this case, the first transmission frame is a first PPDU, the second transmission frame is a second PPDU, the third transmission frame is a third PPDU, and the fourth transmission frame is a fourth PPDU. There may be the following two cases of the first moment determined based on the second moment and/or the third moment.

Case 1: The second moment is earlier than the third moment.

In this case, if the first link is idle between the second moment and the third moment, the first moment is the third moment, to be specific, the first moment is a sending moment of the second PPDU on the second link.

Optionally, if the moment at which the backoff counter of the first link decreases to 0 is earlier than the start moment of the second PPDU on the second link, the transmit MLD does not access the channel on the first link, but continuously monitors a status of the first link until the start moment of the second PPDU. If the first link is idle in a time period of the continuous monitoring, the channel is accessed on the first link, and the first PPDU is sent to the receive MLD at the start moment of the second PPDU on the first link.

It should be noted that a status of a link in this application may be understood as a status of one or more channels on the link. This is uniformly described herein, and details are not described in the following embodiments.

In other words, the moment at which the backoff counter of the first link decreases to 0 is earlier than the sending moment of the second PPDU on the second link, and the first link is idle between the moment at which the backoff counter decreases to 0 and the sending moment of the second PPDU. In this case, a sending moment of the first PPDU is the same as the sending moment of the second PPDU, or the start time of the first PPDU is aligned with the start time of the second PPDU. Certainly, an end time of the first PPDU is also aligned with an end time of the second PPDU.

Optionally, a manner in which the transmit MLD monitors whether the link is idle may be clear channel assessment (clear channel assessment, CCA) or energy detection (energy detection, ED). Certainly, there may alternatively be another manner. This is not specifically limited in this application.

Optionally, when the transmission frame is a PPDU, a backoff start moment may be earlier than the start moment of the second PPDU, or may be later than the start moment of the second PPDU. In addition, an initial value of the backoff counter may or may not vary with different backoff start moments. This is not specifically limited in this application. The solution may also be applicable to the following case 2.

Figure 5A:
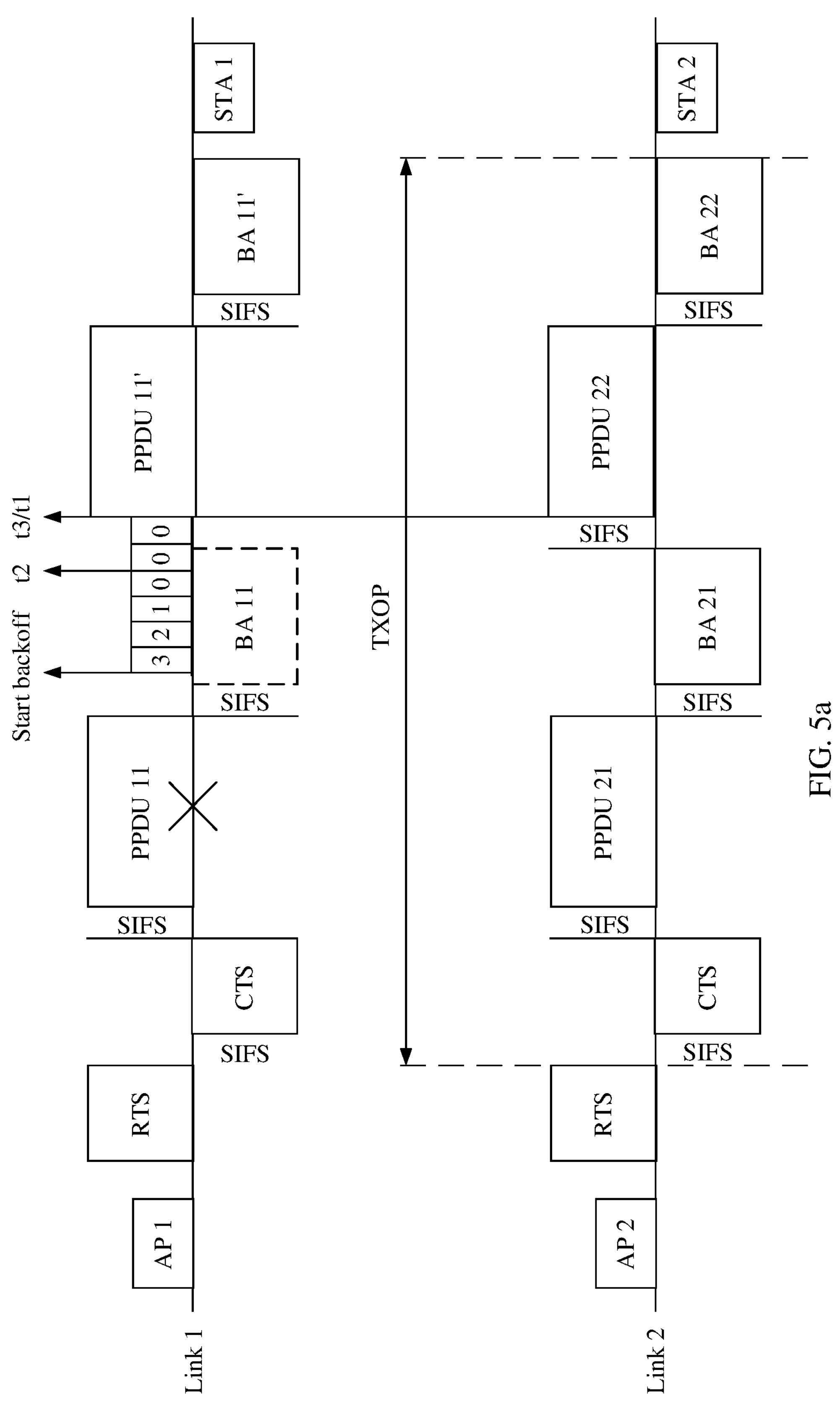
FIG. 5*a* to FIG. 10*d* are schematic diagrams of an application of a multi-link synchronous transmission method according to an embodiment of this application.

For example, the first link is a link 1, the second link is a link 2, the transmit MLD is an AP, the receive MLD is a STA, the backoff start moment is earlier than the start moment of the second PPDU, and the initial value of the backoff counter is 3. As shown in FIG. 5*a*, the third PPDU is a PPDU 11, and a BA 11 is a response frame of the PPDU 11. The first PPDU is a PPDU 11', and a BA 11' is a response frame of the PPDU 11'. The second PPDU is a PPDU 22, and a BA 22 is a response frame of the PPDU 22. ABA 21 is a response frame of a PPDU 21.

In this example, after the PPDU 11 fails to be transmitted, the transmit MLD performs the backoff procedure on the first link, and the backoff counter decreases to 0 at t2 (namely, the second moment). In this case, a sending moment t3 (namely, the third moment) of the PPDU 22 has not arrived. In this way, the transmit MLD continuously monitors a status of the first link. If the first link is idle between t2 and t3, the PPDU 11' is sent at t3. t3 is the first moment, and the first moment may be represented as t1.

A dashed box is used to indicate that a BA is not received. The dashed box in the following accompanying drawings also indicates that content in the box is not received. This is uniformly described herein, and details are not described in the following embodiments.

Optionally, in this case, if the status of the first link becomes busy (busy) at a moment between the second moment and the third moment, the transmit MLD triggers a new backoff procedure on the first link. After a backoff counter of the new backoff procedure decreases to 0, the method in this application may be continued until the first PPDU can be aligned with a PPDU on the second link, or until the first link and the second link are synchronized.

Figure 5B:
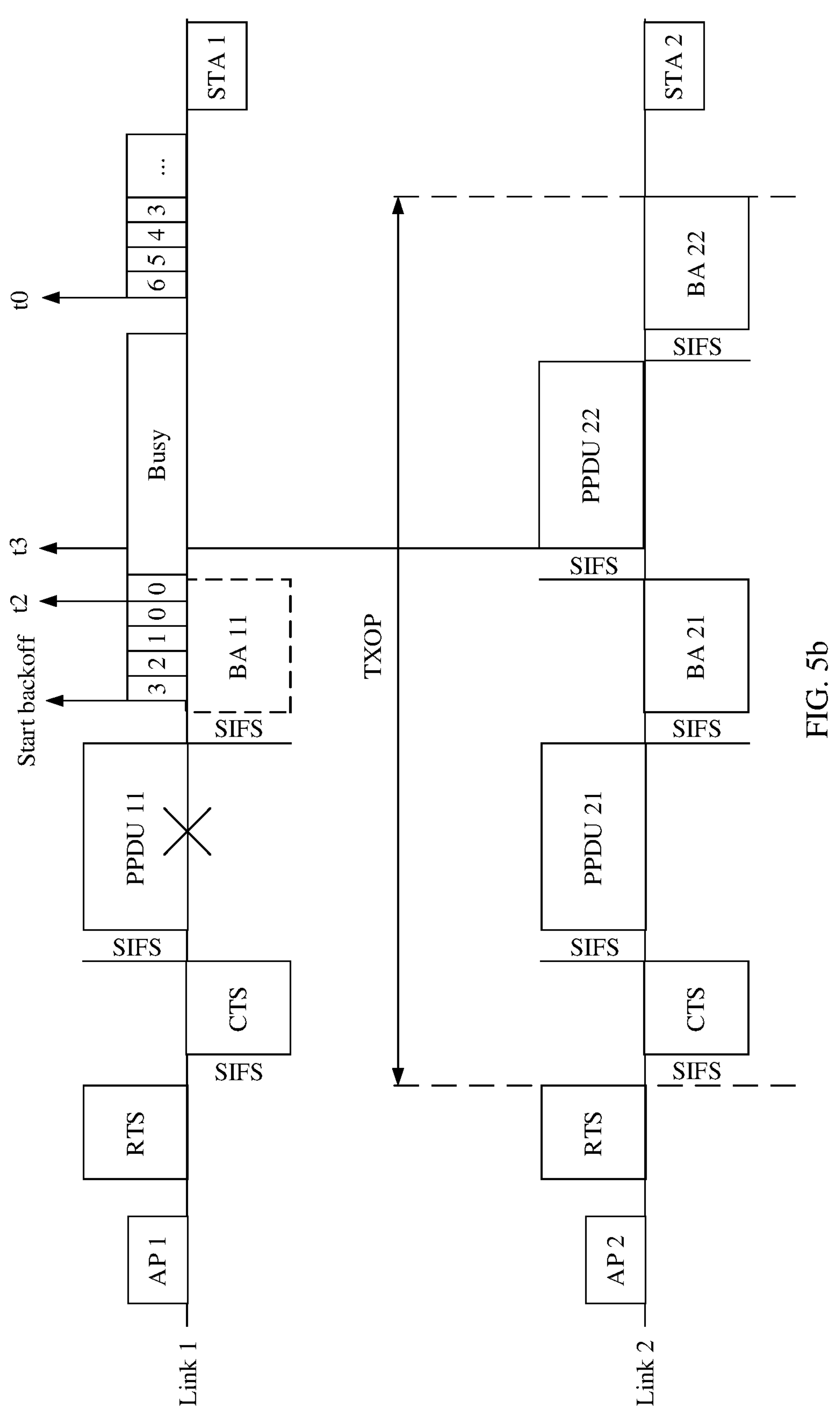

For example, as shown in FIG. 5*b*, the backoff counter of the backoff procedure triggered by a transmission failure of the PPDU 11 decreases to 0 at t2, and the status of the first link becomes busy between t2 and t3. In this case, the transmit MLD triggers a new backoff procedure on the first link at t0, and the method in this application may be continued subsequently.

Optionally, in the case 1, the transmit MLD may be an STR MLD or a non-STR MLD, and the receive MLD may be a non-STR MLD or an STR MLD.

Case 2: The second moment is later than the third moment and earlier than a fourth moment. The fourth moment is an end moment of the second PPDU.

In this case, there are different implementations when the transmit MLD is an STR MLD or a non-STR MLD.

In a possible implementation, the transmit MLD is the STR MLD. In other words, the transmit MLD has an STR capability.

In this case, there are two possibilities of the first moment.

In a first possible case, the first moment is the second moment, to be specific, the first moment is the moment at which the backoff counter of the first link decreases to 0.

Optionally, if the backoff counter of the first link does not decrease to 0 at the sending moment of the second PPDU, the backoff continues. If the moment at which the backoff counter decreases to 0 is earlier than the end moment of the second PPDU, the transmit MLD sends the first PPDU at the moment at which the backoff counter decreases to 0. An end time of the first PPDU is aligned with an end time of the second PPDU.

In other words, the moment at which the backoff counter of the first link decreases to 0 is later than the sending moment of the second PPDU on the second link, and earlier than the end moment of the second PPDU. In this case, the sending moment of the first PPDU is the moment at which the backoff counter of the first link decreases to 0, and an end moment of the first PPDU is the same as the end moment of the second PPDU.

Figure 6A:
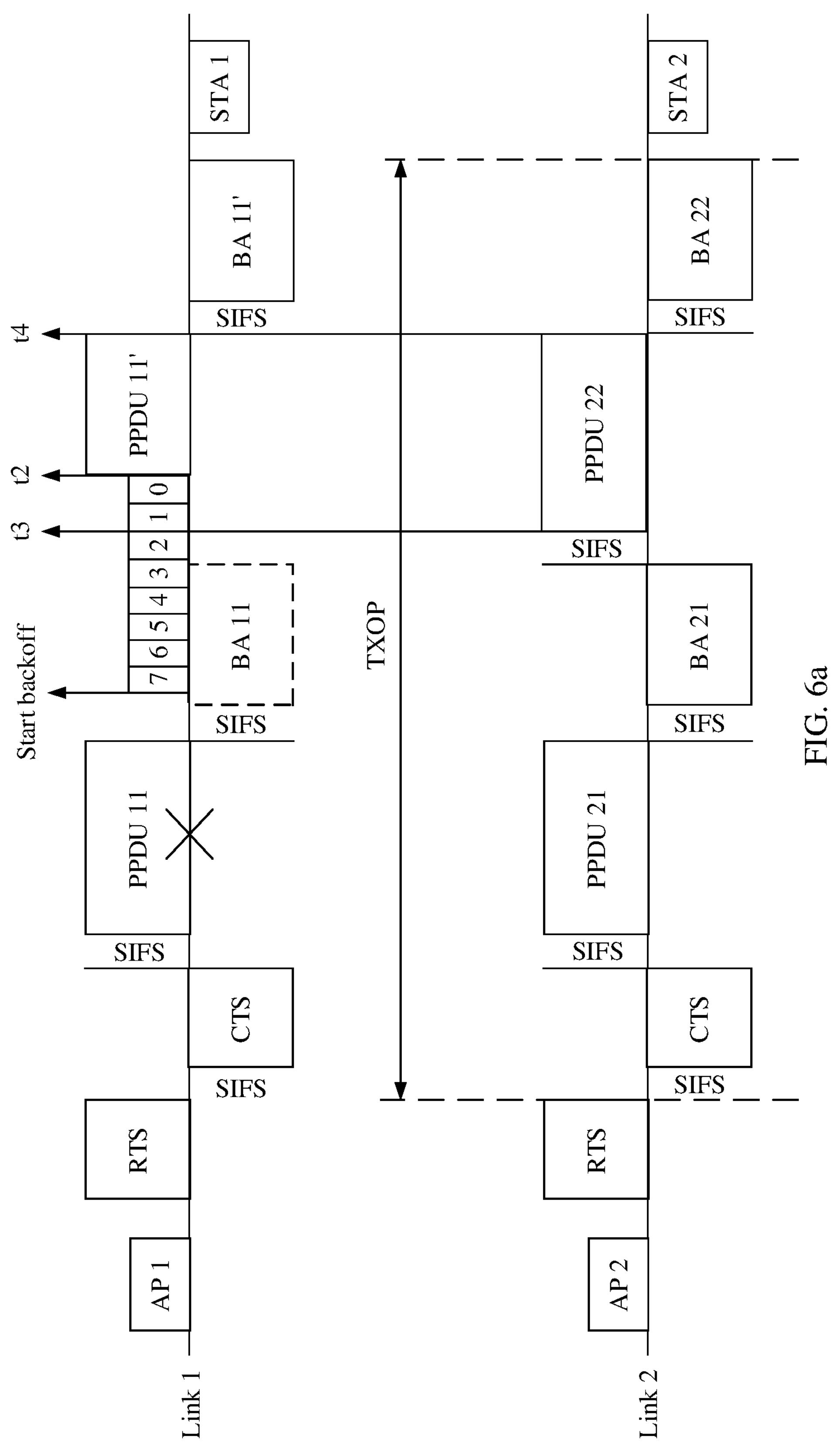

For example, the first link is a link 1, the second link is a link 2, the transmit MLD is an AP, the receive MLD is a STA, the backoff start moment is earlier than the start moment of the second PPDU, and the initial value of the backoff counter is 7. As shown in FIG. 6*a*, the third PPDU is a PPDU 11, and a BA 11 is a response frame of the PPDU 11. The first PPDU is a PPDU 11', and a BA 11' is a response frame of the PPDU 11'. The second PPDU is a PPDU 22, and a BA 22 is a response frame of the PPDU 22. ABA 21 is a response frame of a PPDU 21.

In this example, after the PPDU 11 fails to be transmitted, the transmit MLD performs the backoff procedure on the first link, and the backoff counter decreases to 0 at t2 (namely, the second moment). In this case, a sending moment t3 (namely, the third moment) of the PPDU 22 has arrived, and an end moment t4 (namely, the fourth moment) of the PPDU 22 has not arrived. In this way, the transmit MLD sends the PPDU 11' at t2.

Figure 6B:
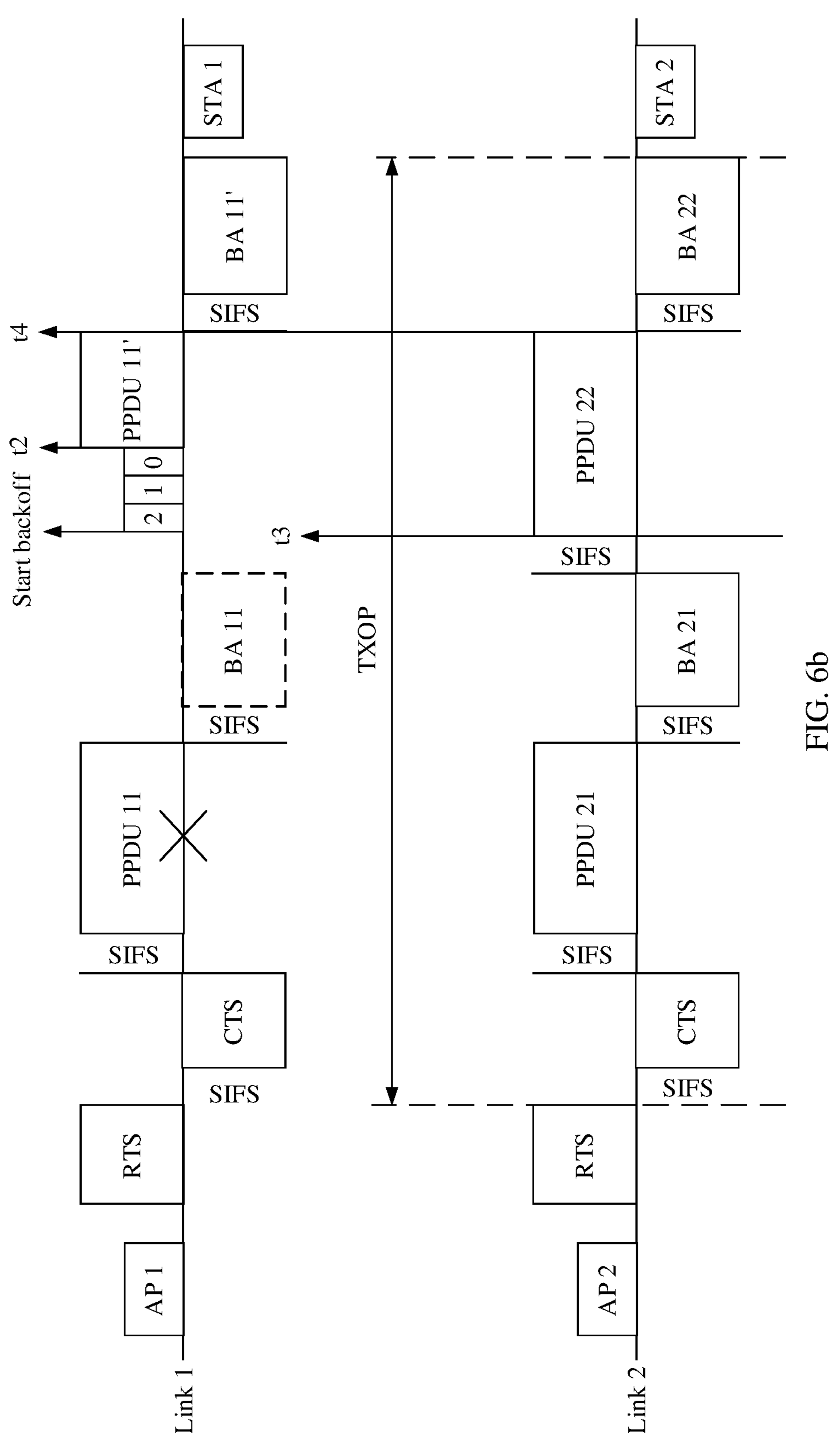

Alternatively, the backoff start moment may be later than the start moment of the second PPDU as shown in FIG. 6*b*. The initial value of the backoff counter is 2. For other descriptions, refer to related descriptions in FIG. 6*a*. Details are not described herein again.

Optionally, when duration between the second moment and the fourth moment is greater than or equal to first duration, the first moment may be the second moment. In other words, when the second moment is later than the third moment and earlier than the fourth moment, and the duration between the second moment and the fourth moment is greater than or equal to the first duration, the first moment is the second moment. The first duration may be predefined in a protocol, or determined independently by the transmit MLD. This is not specifically limited in embodiments of this application. This solution may avoid a problem that the end time of the first PPDU cannot be aligned with the end time of the second PPDU because the duration between the second moment and the fourth moment is very short.

In a second possible case, the first moment is a sending moment of the fourth PPDU on the second link, and the fourth PPDU is a 1st PPDU that is after the second PPDU and that has a same type as the second PPDU.

Optionally, the fourth PPDU is a 1st PPDU after the second PPDU, or a PPDU next to the second PPDU.

Optionally, if the backoff counter of the first link does not decrease to 0 at the sending moment of the second PPDU, the backoff continues. If the moment at which the backoff counter decreases to 0 is earlier than the end moment of the second PPDU, the transmit MLD does not access the channel on the first link, but continuously monitors the status of the first link until the sending moment of the fourth PPDU. If the first link is idle in a time period of the continuous monitoring, the first PPDU is sent to the receive MLD at the start moment of the fourth PPDU on the first link.

In other words, the moment at which the backoff counter of the first link decreases to 0 is later than the sending moment of the second PPDU on the second link and earlier than the end moment of the second PPDU. In addition, the first link is idle between the moment at which the backoff counter decreases to 0 and the sending moment of the fourth PPDU. In this case, the sending moment of the first PPDU is the same as the sending moment of the fourth PPDU, or the start time of the first PPDU is aligned with the start time of the fourth PPDU. Certainly, the end time of the first PPDU is also aligned with an end time of the fourth PPDU.

Alternatively, when the transmit end is the STR MLD, the first moment may be not earlier than an actual end moment of a response frame of the second PPDU. Further, the first moment may be no later than the sending moment of the fourth PPDU. In other words, the first moment may be between the actual end moment of the response frame of the second PPDU and the sending moment of the fourth PPDU.

Figure 6C:
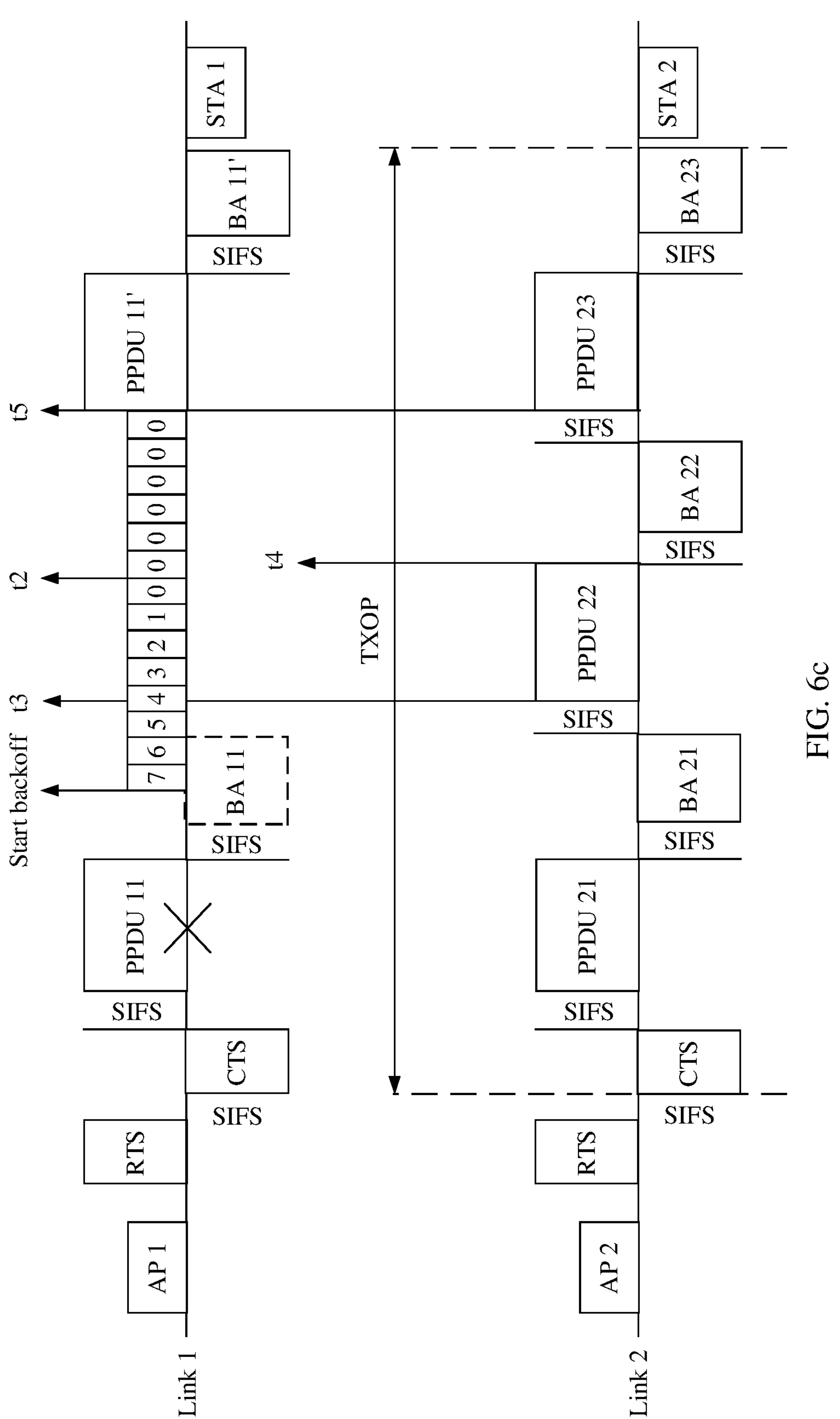

For example, the first link is a link 1, the second link is a link 2, the transmit MLD is an AP, the receive MLD is a STA, the backoff start moment is earlier than the start moment of the second PPDU, and the initial value of the backoff counter is 7. As shown in FIG. 6*c*, the third PPDU is a PPDU 11, and a BA 11 is a response frame of the PPDU 11. The first PPDU is a PPDU 11', and a BA 11' is a response frame of the PPDU 11'. The second PPDU is a PPDU 22, and a BA 22 is a response frame of the PPDU 22. ABA 21 is a response frame of a PPDU 21. The fourth PPDU is a PPDU 23, and a BA 23 is a response frame of the PPDU 23.

In this example, after the PPDU 11 fails to be transmitted, the transmit MLD performs the backoff procedure on the first link, and the backoff counter decreases to 0 at t2 (namely, the second moment). In this case, a sending moment t3 (namely, the third moment) of the PPDU 22 has arrived, and an end moment t4 (namely, the fourth moment) of the PPDU 22 has not arrived. In this way, the transmit MLD continuously monitors the status of the first link from t2 to a start moment (denoted as t5) of the PPDU 23. If the first link is idle in the time period, the PPDU 11' is sent at t5.

Figure 6D:
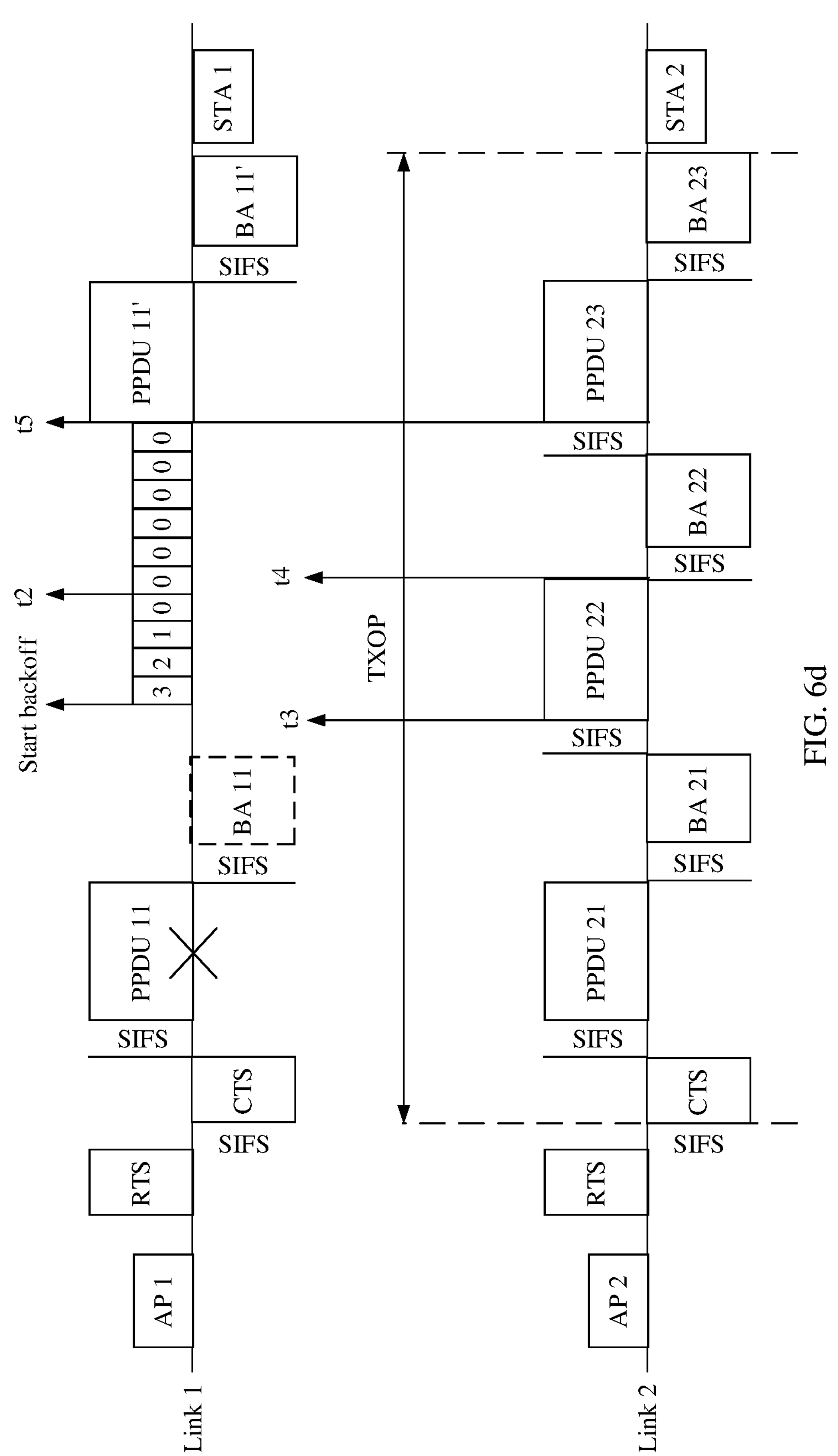

Alternatively, the backoff start moment may be later than the start moment of the second PPDU as shown in FIG. 6*d*. The initial value of the backoff counter is 3. For other descriptions, refer to related descriptions in FIG. 6*c*. Details are not described herein again.

Optionally, when duration between the second moment and the fourth moment is less than or equal to second duration, the first moment may be the start moment of the fourth PPDU. In other words, when the second moment is later than the third moment and earlier than the fourth moment, and the duration between the second moment and the fourth moment is less than or equal to the second duration, the first moment is the start moment of the fourth PPDU. The second duration may be equal to or different from the first duration. This is not specifically limited in embodiments of this application. This solution may avoid a problem that the end time of the first PPDU cannot be aligned with the end time of the second PPDU because the duration between the second moment and the fourth moment is very short.

In another possible implementation, the transmit MLD is the non-STR MLD. In other words, the transmit MLD does not have the STR capability.

In this case, the first moment is the sending moment of the fourth PPDU on the second link, and the fourth PPDU is a PPDU after the second PPDU. For detailed description, refer to related descriptions in FIG. 6*b*. Details are not described herein again.

It should be noted that, in this possible implementation, the first moment is the sending moment of the fourth PPDU regardless of the duration between the moment at which the backoff counter of the first link decreases to 0 and the end moment of the second PPDU. In this way, the start time of the first PPDU may be aligned with a start time of a PPDU on the second link. Certainly, the end time of the first PPDU is also aligned with an end time of the PPDU on the second link.

Case 3: The second moment is later than the fourth moment and earlier than a fifth moment. The fourth moment is the end moment of the second PPDU, the fifth moment is the sending moment of the fourth PPDU on the second link, and the fourth PPDU is a 1st PPDU that is after the second PPDU and that has a same type as the second PPDU.

In this case, the first moment is the fifth moment.

Figure 6E:
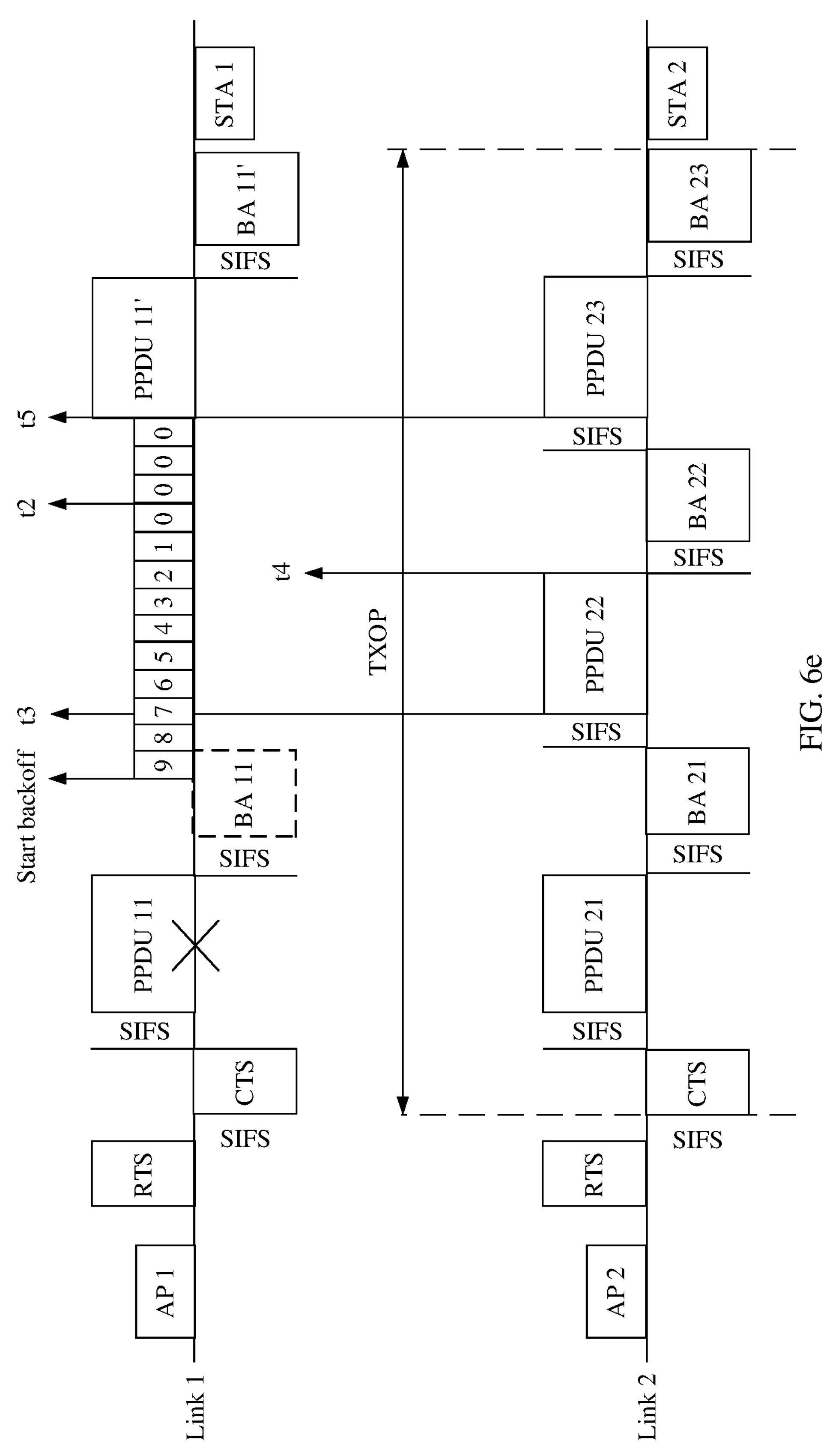

For example, the first link is a link 1, the second link is a link 2, the transmit MLD is an AP, the receive MLD is a STA, the backoff start moment is earlier than the start moment of the second PPDU, and the initial value of the backoff counter is 9. As shown in FIG. 6*e*, the third PPDU is a PPDU 11, and a BA 11 is a response frame of the PPDU 11. The first PPDU is a PPDU 11', and a BA 11' is a response frame of the PPDU 11'. The second PPDU is a PPDU 22, and a BA 22 is a response frame of the PPDU 22. ABA 21 is a response frame of a PPDU 21. The fourth PPDU is a PPDU 23, and a BA 23 is a response frame of the PPDU 23.

In this example, after the PPDU 11 fails to be transmitted, the transmit MLD performs the backoff procedure on the first link, and the backoff counter decreases to 0 at t2 (namely, the second moment). In this case, an end moment t4 (namely, the fourth moment) of the PPDU 22 has arrived, and a start moment (denoted as t5) of the PPDU 23 has not arrived. In this way, the transmit MLD continuously monitors the status of the first link from t2 to the start moment of the PPDU 23. If the first link is idle in the time period, the PPDU 11' is sent at t5.

It should be noted that the foregoing cases may be applicable to uplink transmission, or may be applicable to downlink transmission.

The following describes the solutions of this application by using a transmission frame as an uplink trigger frame. In this case, the first transmission frame is a first uplink trigger frame, the second transmission frame is a second uplink trigger frame, the third transmission frame is a third uplink trigger frame, and the fourth transmission frame is a fourth uplink trigger frame. There may be the following three cases of the first moment determined based on the second moment and/or the third moment.

Case 1: The second moment is earlier than the third moment.

In this case, if the first link is idle between the second moment and the third moment, the first moment is the third moment, to be specific, the first moment is a sending moment of the second uplink trigger frame on the second link. Detailed implementation is similar to the case 1 in which the transmission frame is a PPDU. A difference lies in that the transmission frame is an uplink trigger frame in this case, that is, the PPDU is replaced with the uplink trigger frame for understanding. For details, refer to related descriptions in the case 1. Details are not described herein again.

Optionally, when the transmission frame is the uplink trigger frame, the backoff start moment may be earlier than a predicted end moment of a TB PPDU corresponding to the third uplink trigger frame, or may be later than the predicted end moment of the TB PPDU corresponding to the third uplink trigger frame. In addition, the initial value of the backoff counter may or may not vary with the backoff start moment. This is not specifically limited in this application. The solution may also be applicable to the following case 2 and case 3.

Figure 7A:
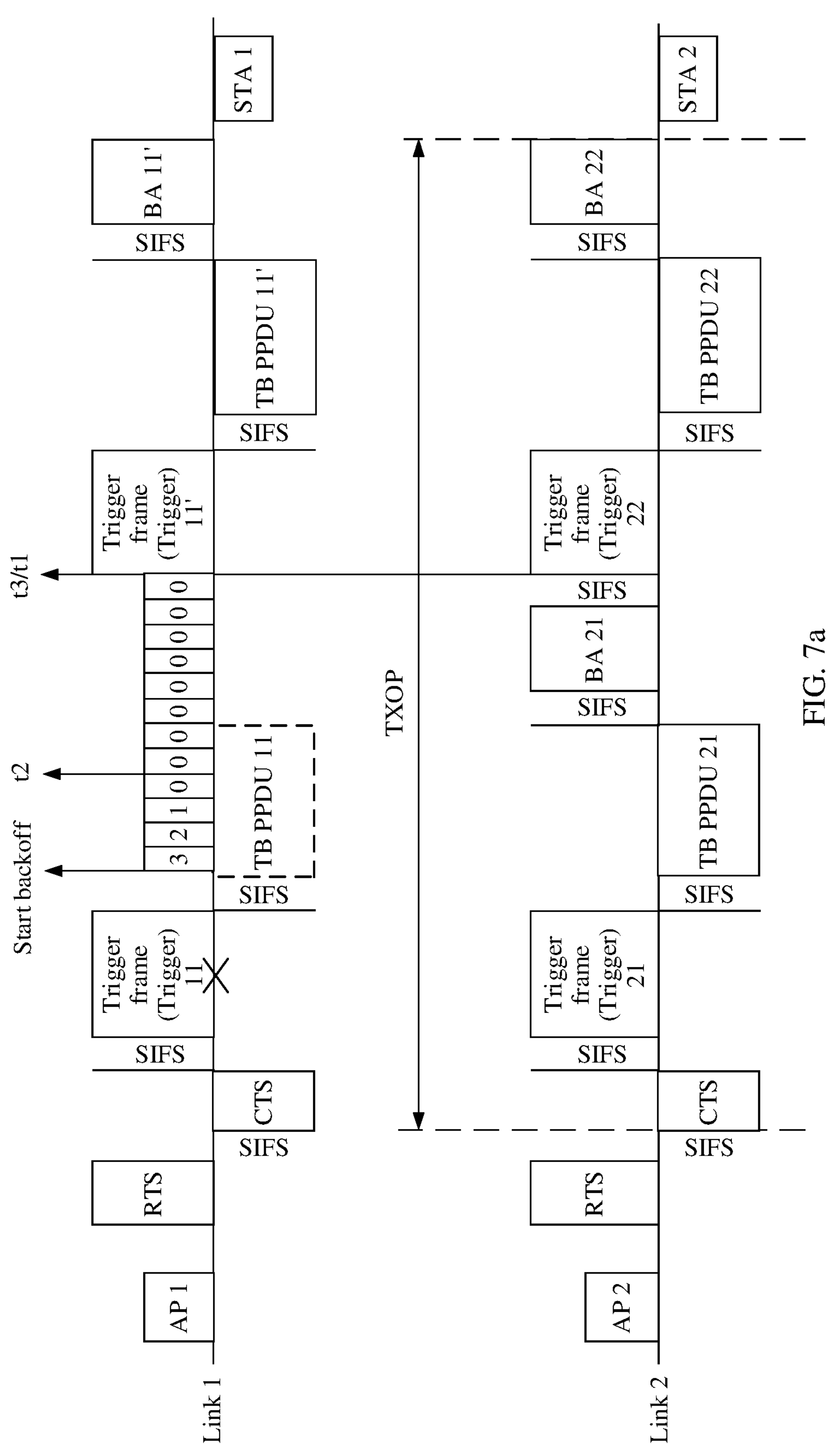

It may be understood that the predicted end moment of the TB PPDU corresponding to the third uplink trigger frame may be a moment after a length of the TB PPDU from a moment at which the transmit MLD receives the TB PPDU assuming that the third uplink trigger frame is normally transmitted. Alternatively, an interval between the predicted end moment of the TB PPDU corresponding to the third uplink trigger frame and an end moment of the third uplink trigger frame is a sum of an SIFS and the length of the TB PPDU. For example, the first link is a link 1, the second link is a link 2, the transmit MLD is an AP, the receive MLD is a STA, the backoff start moment is earlier than the predicted end moment of the TB PPDU corresponding to the third uplink transmission frame, and the initial value of the backoff counter is 3. As shown in FIG. 7*a*, the third uplink trigger frame is a trigger 11, and a TB PPDU 11 is a TB PPDU corresponding to the trigger 11. The first uplink trigger frame is a trigger 11', and a TB PPDU 11' is a TB PPDU corresponding to the trigger 11'. The second uplink trigger frame is a trigger 22, and a TB PPDU 22 is a TB PPDU corresponding to the trigger 22.

In this example, after the trigger 11 fails to be transmitted, the transmit MLD performs the backoff procedure on the first link, and the backoff counter decreases to 0 at t2 (namely, the second moment). In this case, a sending moment t3 (namely, the third moment) of the PPDU 22 has not arrived. In this way, the transmit MLD continuously monitors a status of the first link. If the first link is idle between t2 and t3, the trigger 11' is sent at t3. t3 is the first moment, and the first moment may be represented as t1.

Figure 7B:
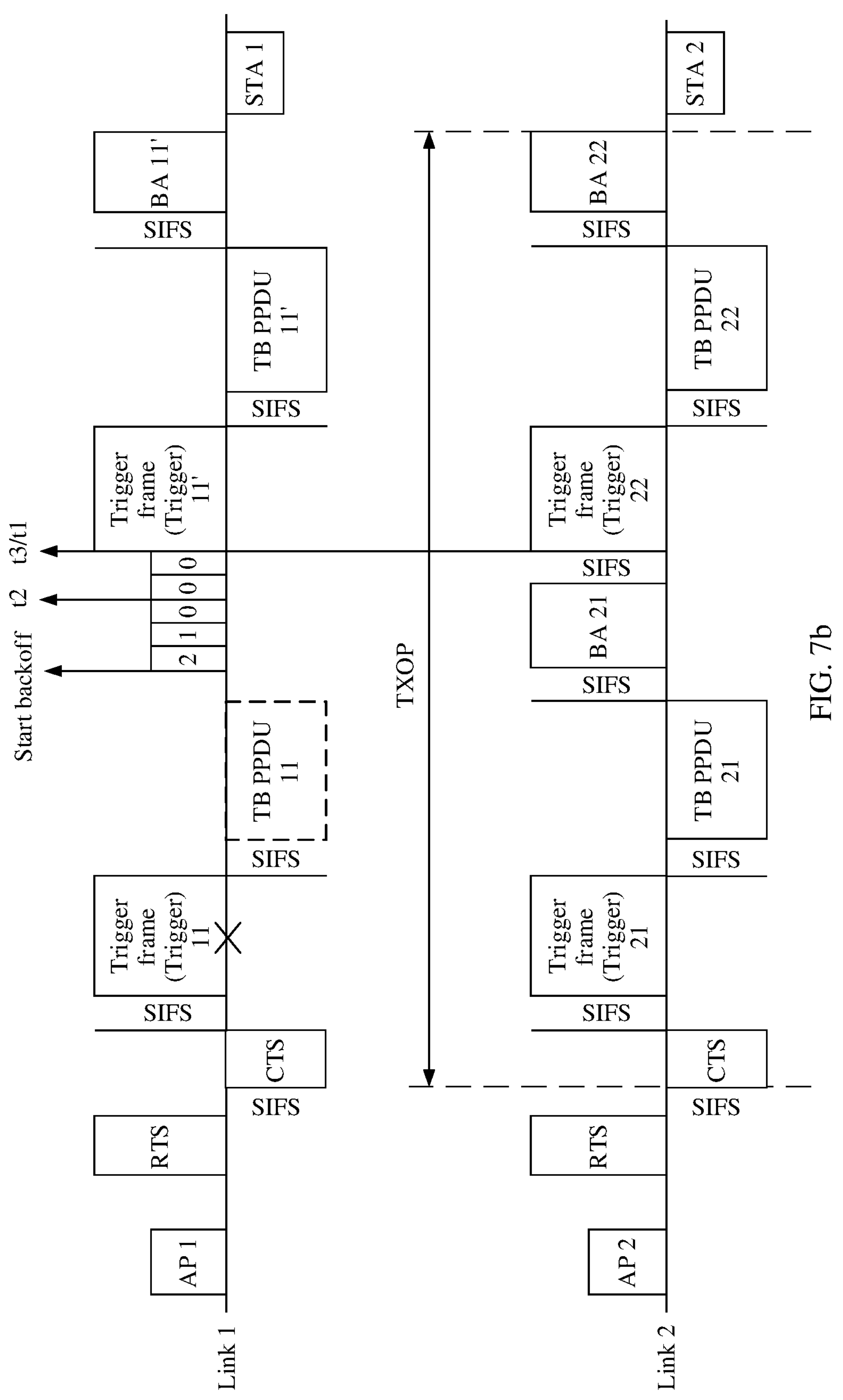

Alternatively, as shown in FIG. 7*b*, the backoff start moment may be later than the predicted end moment of the TB PPDU corresponding to the third uplink transmission frame. The initial value of the backoff counter is 2. For other descriptions, refer to related descriptions in FIG. 7*a*. Details are not described herein again.

Case 2: The second moment is later than the third moment and earlier than a fourth moment. The fourth moment is an end moment of the second PPDU.

In this case, there are different implementations when the transmit MLD is an STR MLD or a non-STR MLD.

In a possible implementation, the transmit MLD is the STR MLD. In other words, the transmit MLD has an STR capability.

In this case, there are two possibilities of the first moment.

In a first possible case, the first moment is the second moment, to be specific, the first moment is the moment at which the backoff counter of the first link decreases to 0. Detailed implementation is similar to the first possible case in the case 2 in which the transmission frame is a PPDU. A difference lies in that the transmission frame is an uplink trigger frame in this case, that is, the PPDU is replaced with the uplink trigger frame for understanding. For details, refer to related descriptions in the case 2. Details are not described herein again.

Figure 8A:
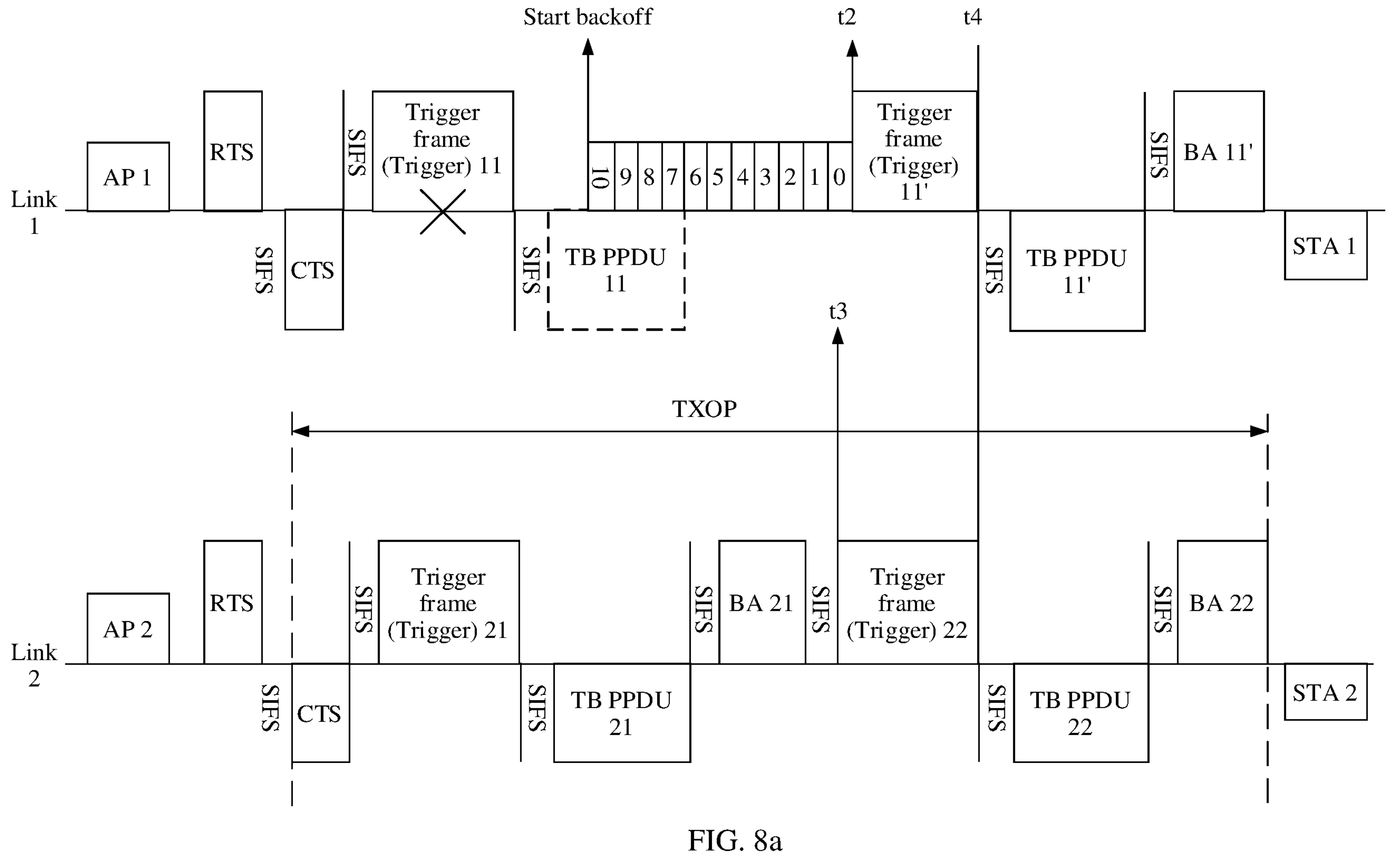

For example, the first link is a link 1, the second link is a link 2, the transmit MLD is an AP, the receive MLD is a STA, the backoff start moment is earlier than the predicted end moment of the TB PPDU corresponding to the third uplink transmission frame, and the initial value of the backoff counter is 10. As shown in FIG. 8*a*, the third uplink trigger frame is a trigger 11, and a TB PPDU 11 is a TB PPDU corresponding to the trigger 11. The first uplink trigger frame is a trigger 11', and a TB PPDU 11' is a TB PPDU corresponding to the trigger 11'. The second uplink trigger frame is a trigger 22, and a TB PPDU 22 is a TB PPDU corresponding to the trigger 22.

In this example, after the trigger 11 fails to be transmitted, the transmit MLD performs the backoff procedure on the first link, and the backoff counter decreases to 0 at t2 (namely, the second moment). In this case, a sending moment t3 (namely, the third moment) of the trigger 22 has arrived, and an end moment t4 (namely, the fourth moment) of the trigger 22 has not arrived. In this way, the transmit MLD sends the trigger 11' at t2.

Figure 8B:
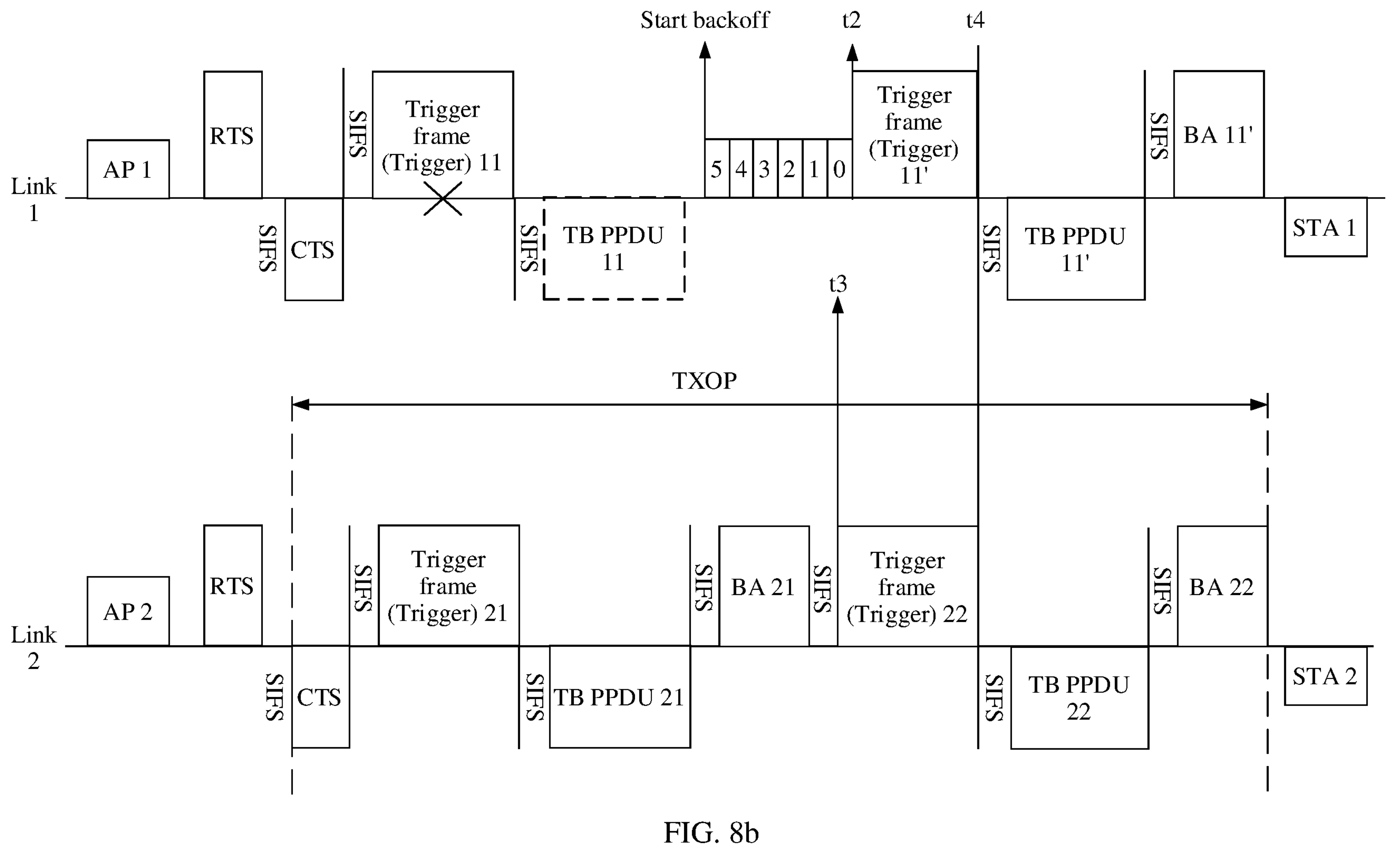

Alternatively, as shown in FIG. 8*b*, the backoff start moment may be later than the predicted end moment of the TB PPDU corresponding to the third uplink transmission frame. The initial value of the backoff counter is 5. For other descriptions, refer to related descriptions in FIG. 8*a*. Details are not described herein again.

In a second possible case, the first moment is a sending moment of the fourth uplink trigger frame on the second link, and the fourth uplink trigger frame is an uplink trigger frame after the second uplink trigger frame. Optionally, the fourth uplink trigger frame is a 1st uplink trigger frame after the second uplink trigger frame.

Detailed implementation is similar to the second possible case in the case 2 in which the transmission frame is a PPDU. A difference lies in that the transmission frame is an uplink trigger frame in this case, that is, the PPDU is replaced with the uplink trigger frame for understanding. For details, refer to related descriptions in the case 2. Details are not described herein again.

Figure 8C:
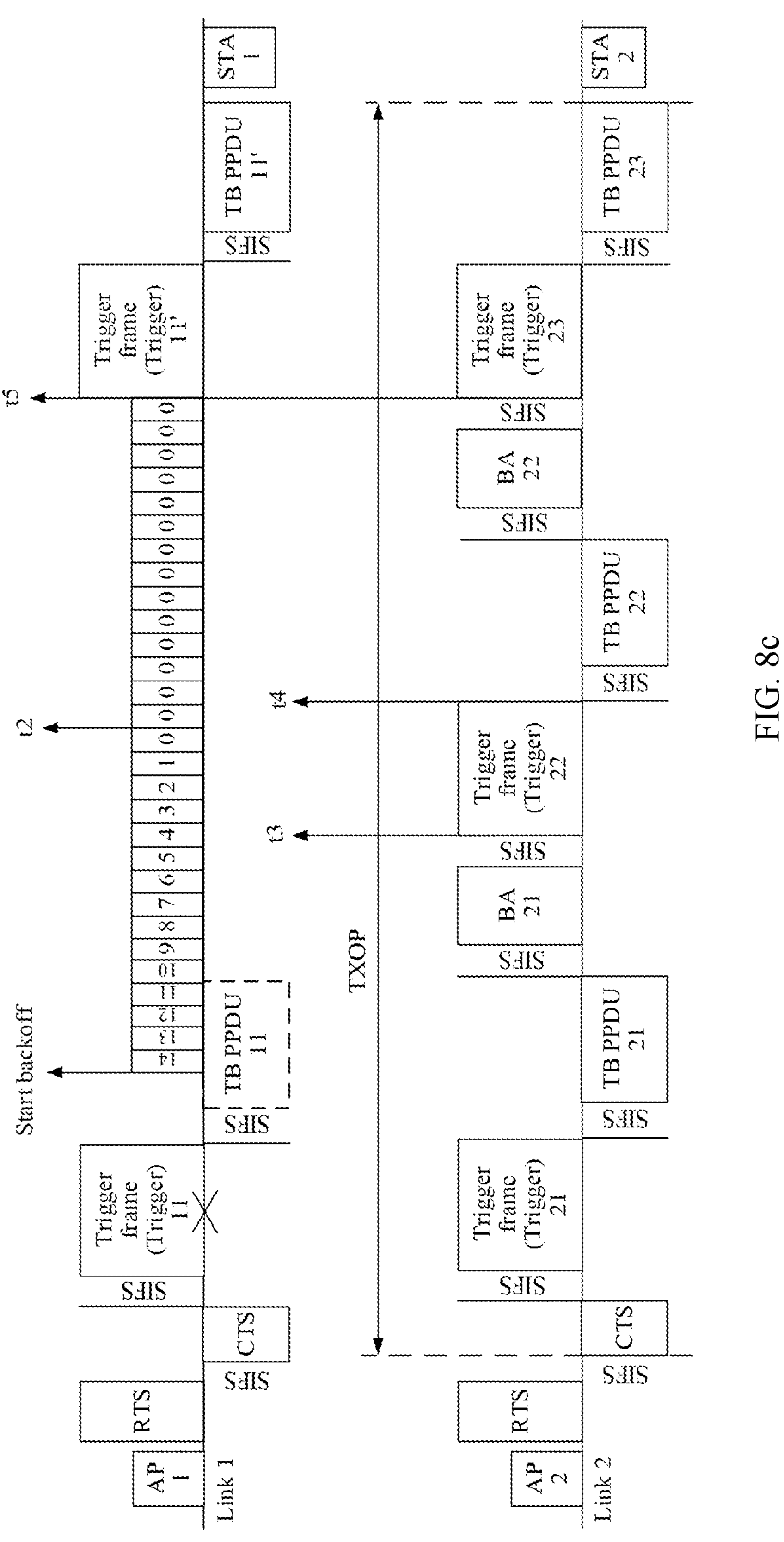

For example, the first link is a link 1, the second link is a link 2, the transmit MLD is an AP, the receive MLD is a STA, the backoff start moment is earlier than the predicted end moment of the TB PPDU corresponding to the third uplink transmission frame, and the initial value of the backoff counter is 14. As shown in FIG. 8*c*, the third uplink trigger frame is a trigger 11, and a TB PPDU 11 is a TB PPDU corresponding to the trigger 11. The first uplink trigger frame is a trigger 11', and a TB PPDU 11' is a TB PPDU corresponding to the trigger 11'. The second uplink trigger frame is a trigger 22, and a TB PPDU 22 is a TB PPDU corresponding to the trigger 22. The fourth uplink trigger frame is a trigger 23, and a TB PPDU 23 is a TB PPDU corresponding to the trigger 23.

In this example, after the trigger 11 fails to be transmitted, the transmit MLD performs the backoff procedure on the first link, and the backoff counter decreases to 0 at t2 (namely, the second moment). In this case, a sending moment t3 (namely, the third moment) of the trigger 22 has arrived, and an end moment t4 (namely, the fourth moment) of the trigger 22 has not arrived.

In this way, the transmit MLD continuously monitors the status of the first link from t2 to a start moment (denoted as t5) of the trigger 23. If the first link is idle in the time period, the trigger 11' is sent at t5.

Figure 8D:
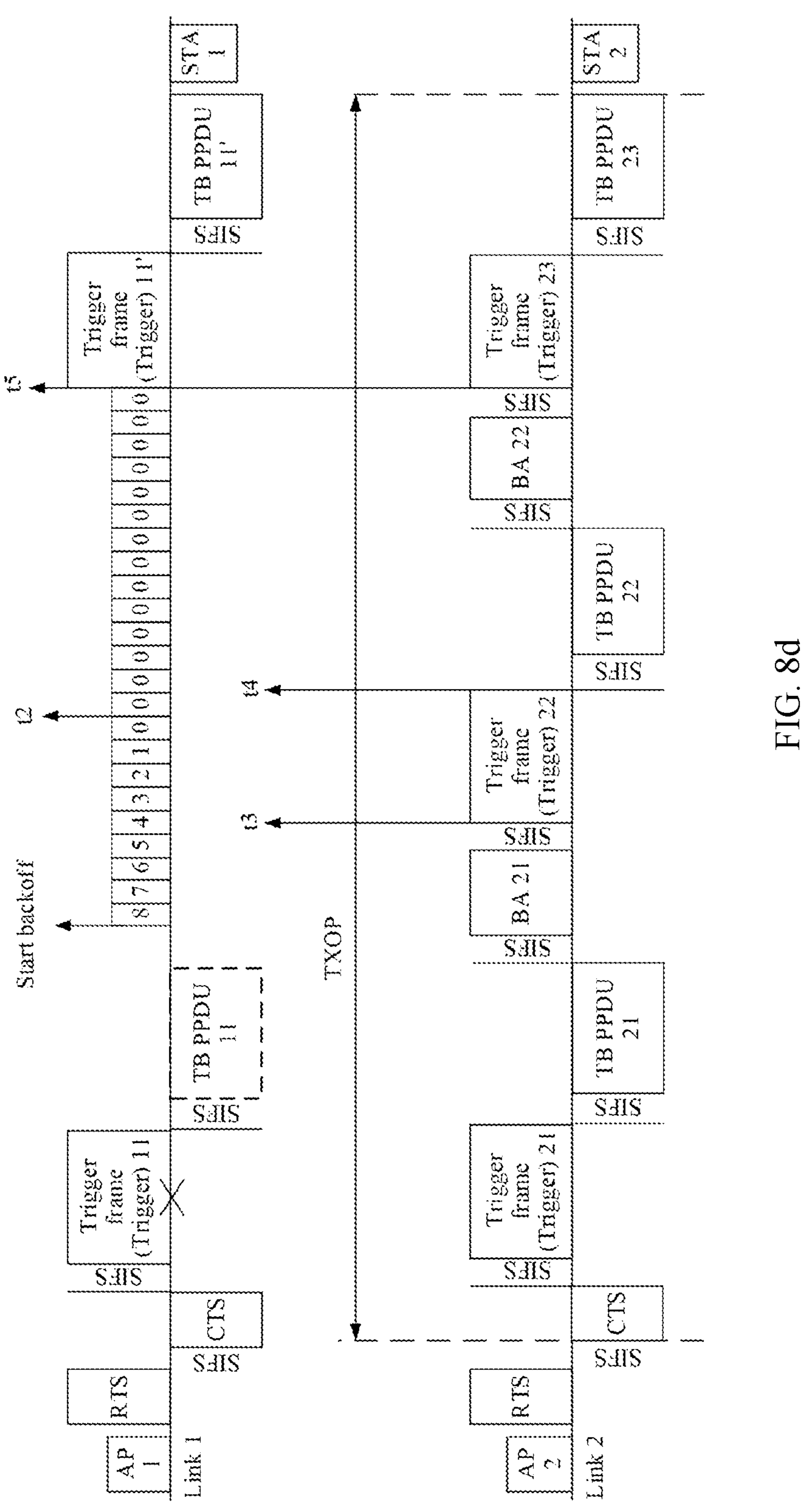

Alternatively, as shown in FIG. 8*d*, the backoff start moment may be later than the predicted end moment of the TB PPDU corresponding to the third uplink transmission frame. The initial value of the backoff counter is 8. For other descriptions, refer to related descriptions in FIG. 8*c*. Details are not described herein again.

Case 3: The second moment is later than the fourth moment and earlier than a fifth moment.

In this case, the first moment is the fifth moment. The fourth moment is an end moment of the second uplink trigger frame, the fifth moment is the sending moment of the fourth uplink trigger frame on the second link, and the fourth uplink trigger frame is an uplink trigger frame after the second uplink trigger frame.

Optionally, the fourth uplink trigger frame is a 1st uplink trigger frame after the second uplink trigger frame, or an uplink trigger frame next to the second uplink trigger frame.

Optionally, if the backoff counter of the first link does not decrease to 0 at the end moment of the second uplink trigger frame, the backoff continues. If the moment at which the backoff counter decreases to 0 is earlier than a start moment of the fourth uplink trigger frame, the transmit MLD does not access the channel on the first link, but continuously monitors the status of the first link until the sending moment of the fourth uplink trigger frame. If the first link is idle in a time period of the continuous monitoring, the first uplink trigger frame is sent to the receive MLD at the start moment of the fourth uplink trigger frame on the first link.

In other words, the backoff counter of the first link decreases to 0 after the end moment of the second uplink trigger frame and before the sending moment of the fourth uplink trigger frame. In addition, the first link is idle between the moment at which the backoff counter decreases to 0 and the sending moment of the fourth uplink trigger frame. In this case, a sending moment of the first uplink trigger frame is the same as the sending moment of the fourth uplink trigger frame, or a start time of the first uplink trigger frame is aligned with a start time of the fourth uplink trigger frame. Certainly, an end time of the first uplink trigger frame is also aligned with an end time of the fourth uplink trigger frame.

Alternatively, when the transmit end is the STR MLD, the first moment may be not earlier than an actual end moment of a response frame (for example, a BA) of the second uplink trigger frame. Further, the first moment is no later than the sending moment of the fourth uplink trigger frame. In other words, the first moment may be between the actual end moment of the response frame of the second uplink trigger frame and the sending moment of the fourth uplink trigger frame.

Figure 9A:
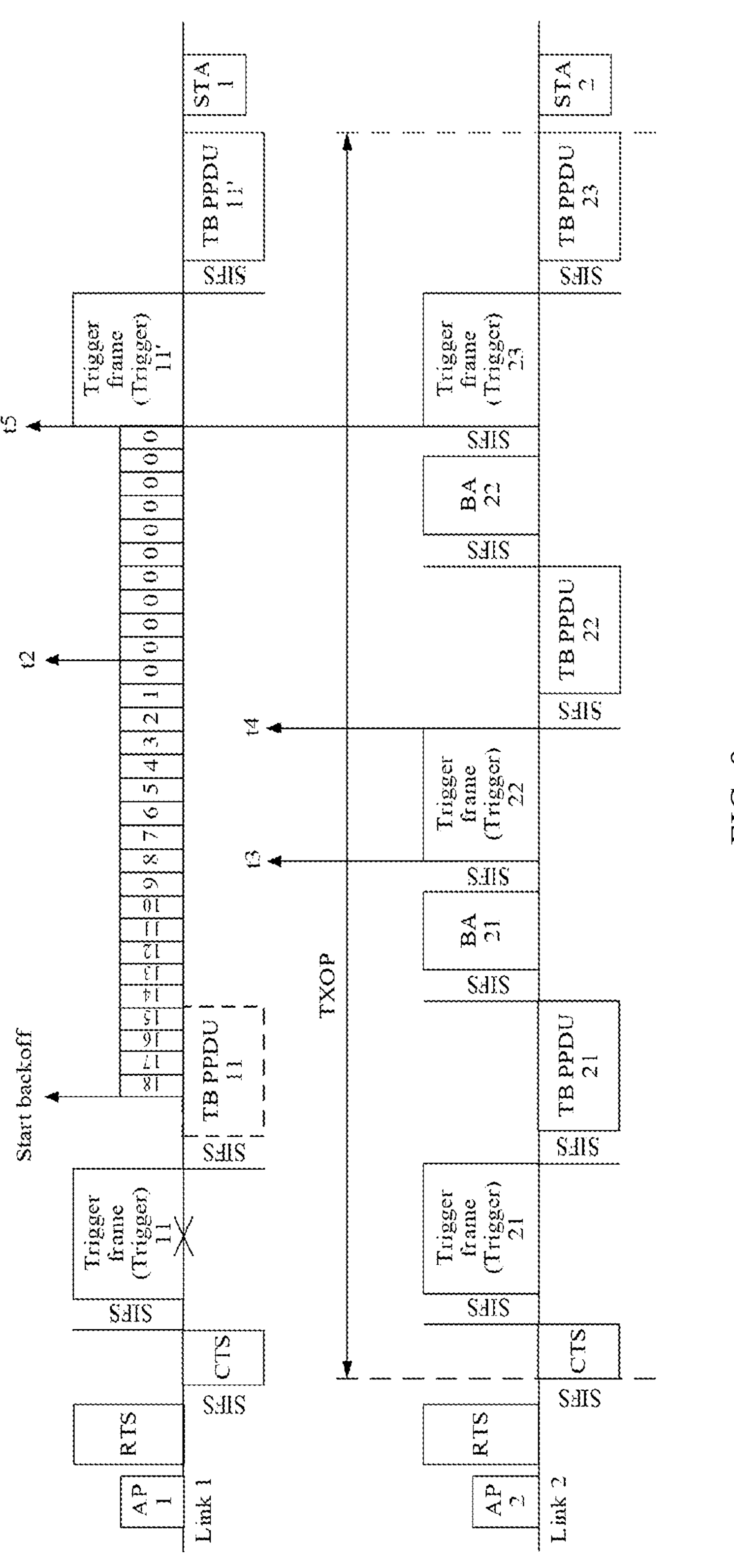

For example, the first link is a link 1, the second link is a link 2, the transmit MLD is an AP, the receive MLD is a STA, the backoff start moment is earlier than the predicted end moment of the TB PPDU corresponding to the third uplink transmission frame, and the initial value of the backoff counter is 18. As shown in FIG. 9*a*, the third uplink trigger frame is a trigger 11, and a TB PPDU 11 is a PPDU corresponding to the trigger 11. The first uplink trigger frame is a trigger 11', and a TB PPDU 11' is a PPDU corresponding to the trigger 11'. The second uplink trigger frame is a trigger 22, and a TB PPDU 22 is a PPDU corresponding to the trigger 22. The fourth uplink trigger frame is a trigger 23, and a TB PPDU 23 is a PPDU corresponding to the trigger 23.

In this example, after the trigger 11 fails to be transmitted, the transmit MLD performs the backoff procedure on the first link, and the backoff counter decreases to 0 at t2 (namely, the second moment). In this case, a sending moment t3 (namely, the third moment) of the trigger 22 and an end moment t4 of the trigger have arrived, and a start moment t5 (namely, the fifth moment) of the trigger 23 has not arrived. If the first link is idle between t2 and t5, the transmit MLD sends the trigger 11' at t5.

Figure 9B:
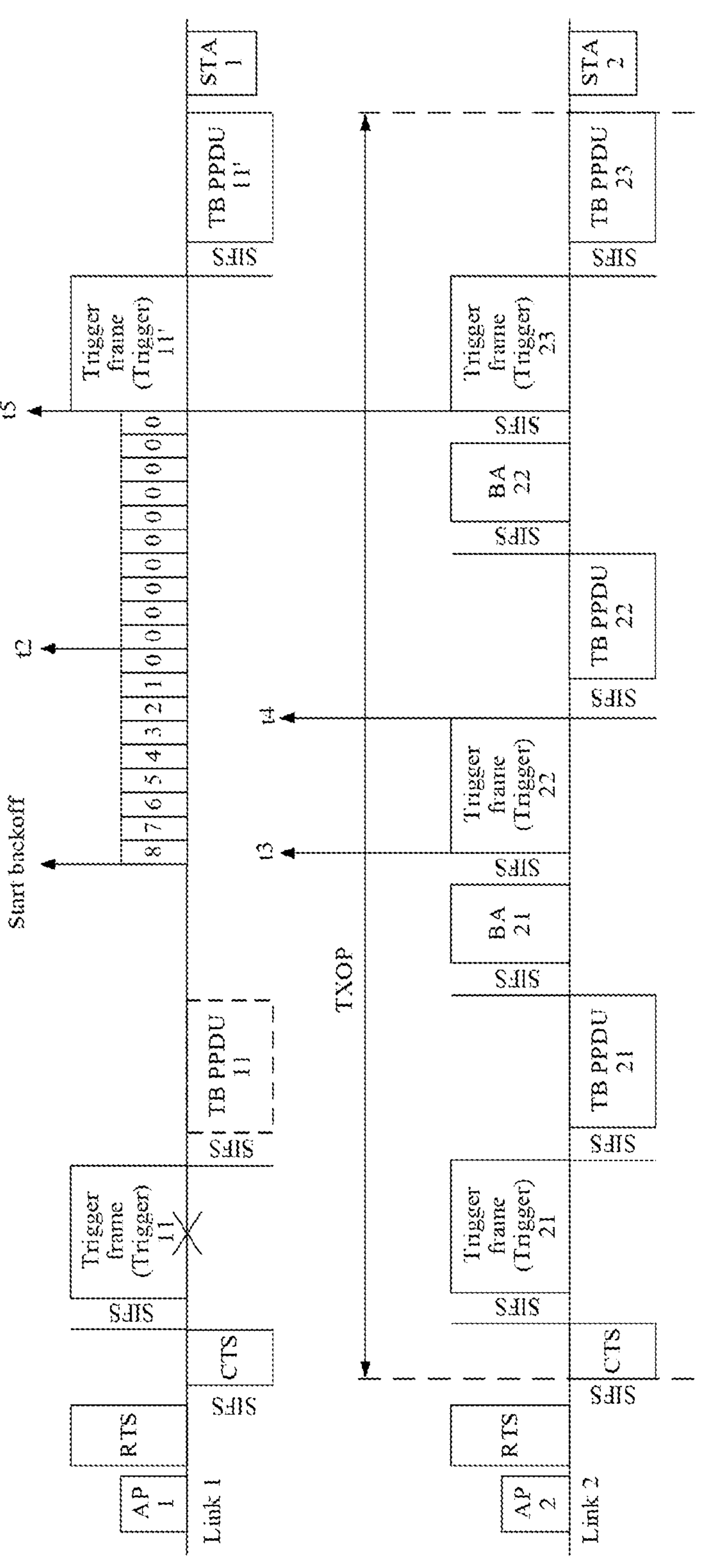

Alternatively, as shown in FIG. 9*b*, the backoff start moment may be later than the predicted end moment of the TB PPDU corresponding to the third uplink transmission frame. The initial value of the backoff counter is 8. For other descriptions, refer to related descriptions in FIG. 9*a*. Details are not described herein again.

The foregoing is various possible cases of the first moment when the transmission frame is an uplink transmission frame.

In addition, this application further provides a multi-link synchronous transmission method in a PPDU error scenario and a BA error scenario. The following is described by using an example in which links between a transmit MLD and a receive MLD include a first link and a second link.

For a PPDU error:

In the method, after a third PPDU on the first link fails to be transmitted, the transmit MLD may perform PIFS recovery. If an end moment of the PIFS recovery is earlier than a sending moment of a second PPDU on the second link, and the first link is idle between the end moment of the PIFS recovery and the sending moment of the second PPDU, a moment at which the transmit MLD sends a first PPDU on the first link is the same as the sending moment of the second PPDU. The first PPDU is used to retransmit an error part of the third PPDU.

Optionally, in this solution, the PIFS recovery may be performed immediately after transmission of the third PPDU ends, that is, a PIFS recovery start moment may be an end moment of the third PPDU. Alternatively, the third PPDU fails to be transmitted, and after a period of time, the PIFS recovery may be performed, that is, the PIFS recovery start moment may be later than a predicted start moment of a response frame of the third PPDU.

It may be understood that the predicted start moment of the response frame of the third PPDU may be a moment at which the transmit MLD receives the response frame of the third PPDU assuming that the third PPDU is normally transmitted. Alternatively, an interval between the predicted start moment of the response frame of the third PPDU and the end moment of the third PPDU is an SIFS.

Figure 10A:
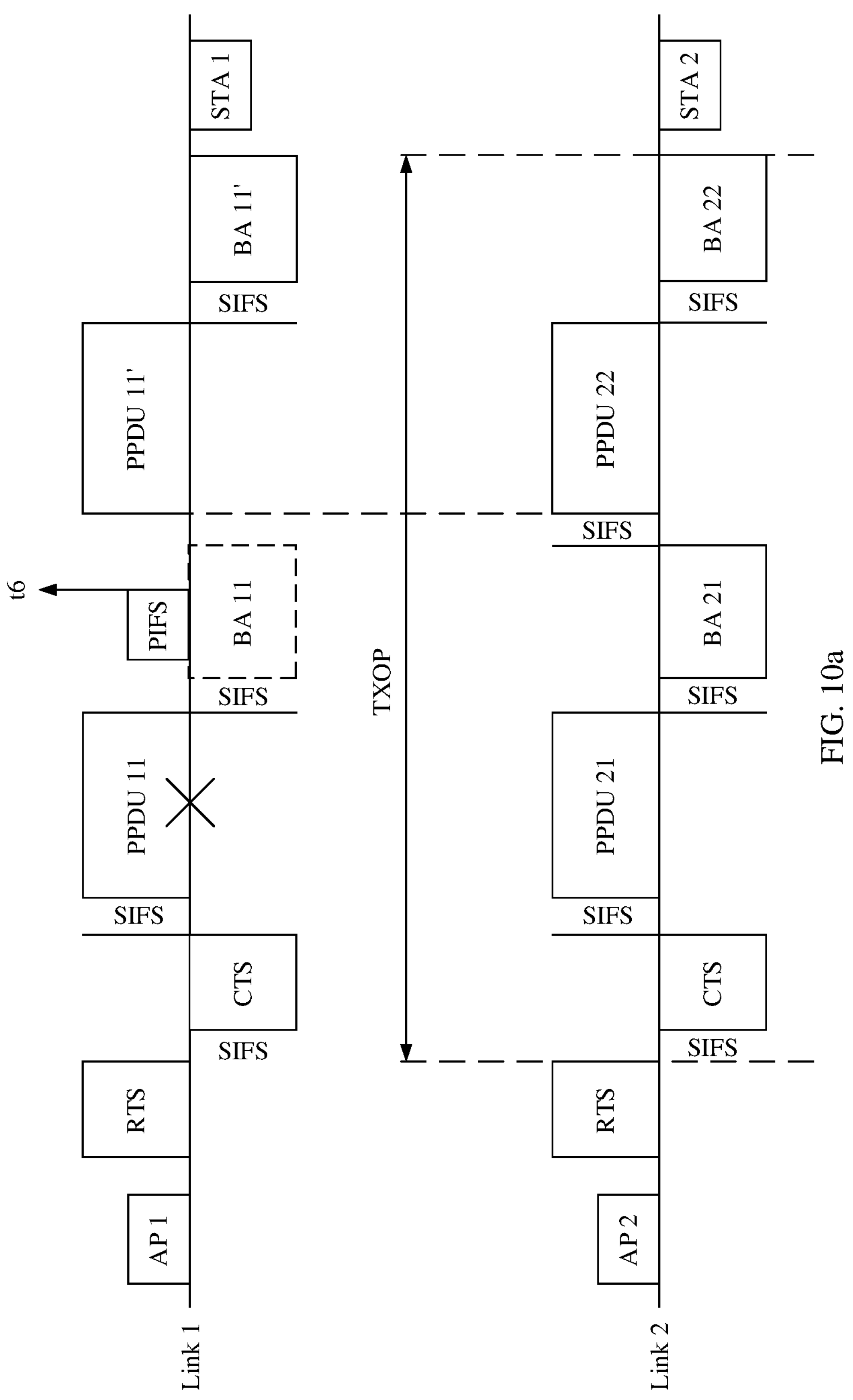

For example, the first link is a link 1, the second link is a link 2, the transmit MLD is an AP, the receive MLD is a STA, and the PIFS recovery start moment is later than the predicted start moment of the response frame of the third PPDU. As shown in FIG. 10*a*, the third PPDU is a PPDU 11, and a BA 11 is a response frame of the PPDU 11. The first PPDU is a PPDU 11', and a BA 11' is a response frame of the PPDU 11'. The second PPDU is a PPDU 22, and a BA 22 is a response frame of the PPDU 22. ABA 21 is a response frame of a PPDU 21.

In this example, after the PPDU 11 fails to be transmitted, the transmit MLD performs the PIFS recovery on the first link, and a PIFS recovery end moment t6 is earlier than a sending moment of the PPDU 22. In this case, the transmit MLD does not immediately access a channel on the link 1 after the PIFS recovery is completed (t6), but waits until the sending moment of the PPDU 22 on the link 2. If the link 1 is idle between t6 and the sending moment of the PPDU 22, the transmit MLD sends the PPDU 11' at the sending moment of the PPDU 22. In other words, a start time of the PPDU 11' is the same as a start time of the PPDU 22. Certainly, an end time of the PPDU 11' is also the same as an end time of the PPDU 22.

Figure 10B:
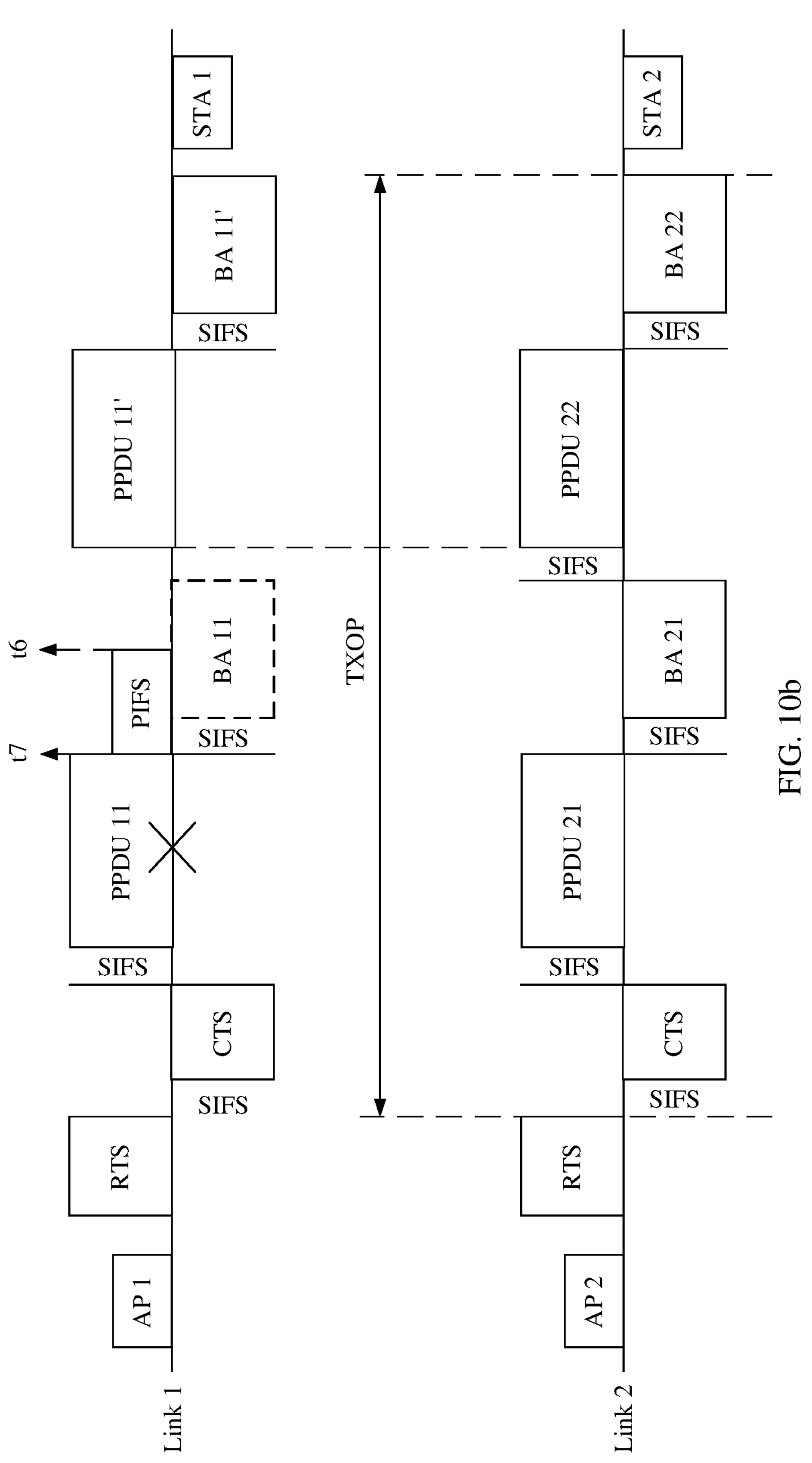

Alternatively, for example, the PIFS recovery start moment is the end moment of the third PPDU. An example diagram of this solution may be shown in FIG. 10*b*, and t7 is the PIFS recovery start moment, namely, the end moment of the third PPDU. For other descriptions, refer to related descriptions in FIG. 10*a*. Details are not described herein again.

Optionally, if a status of the first link becomes busy between the PIFS recovery end moment and the sending moment of the second PPDU, the transmit MLD may trigger a backoff procedure after the first link is idle. Subsequently, synchronous transmission on multiple links may be performed by using the methods provided in FIG. 4 to FIG. 6*b*. For details, refer to the foregoing descriptions. Details are not described herein again.

Figure 10C:
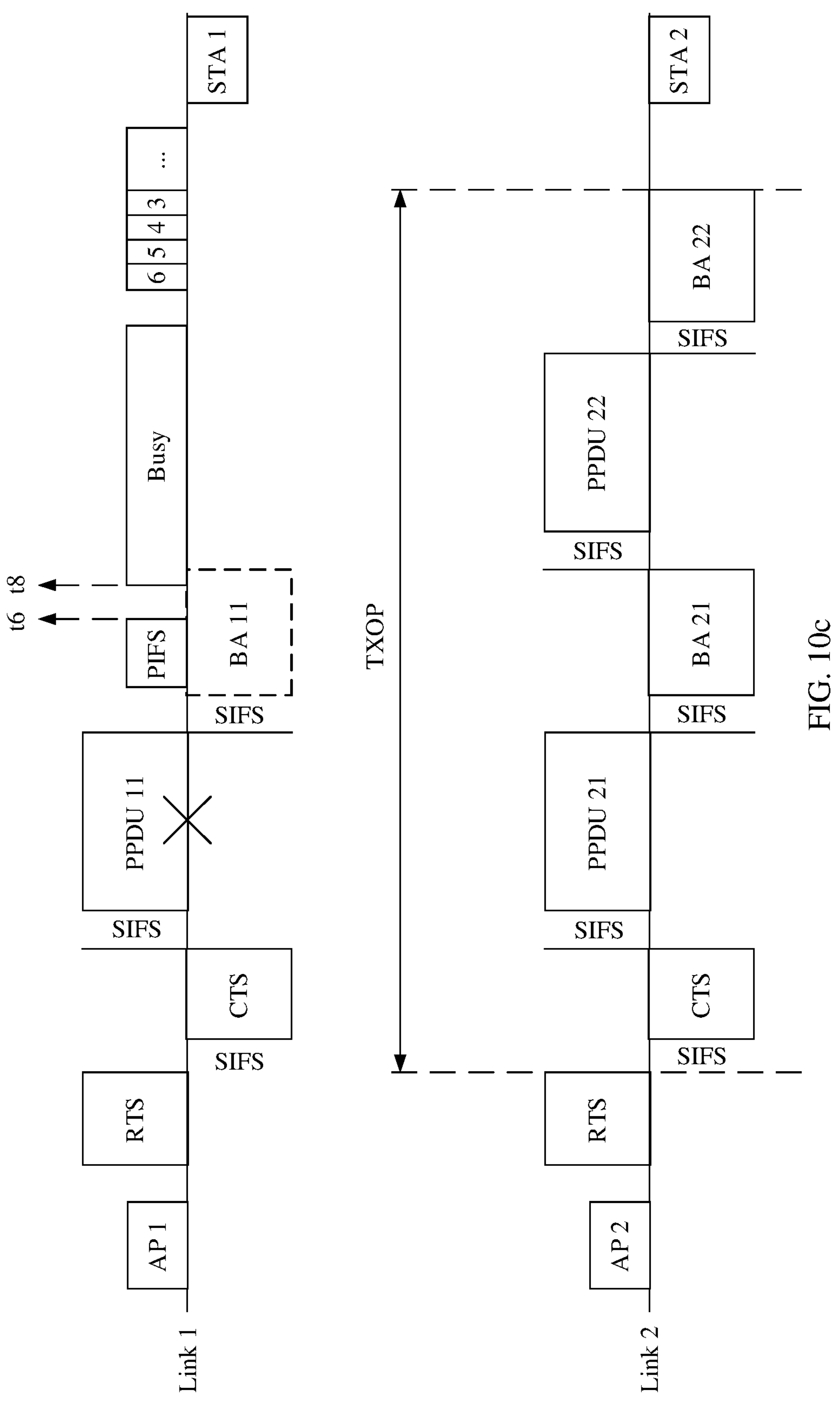
Figure 10D:
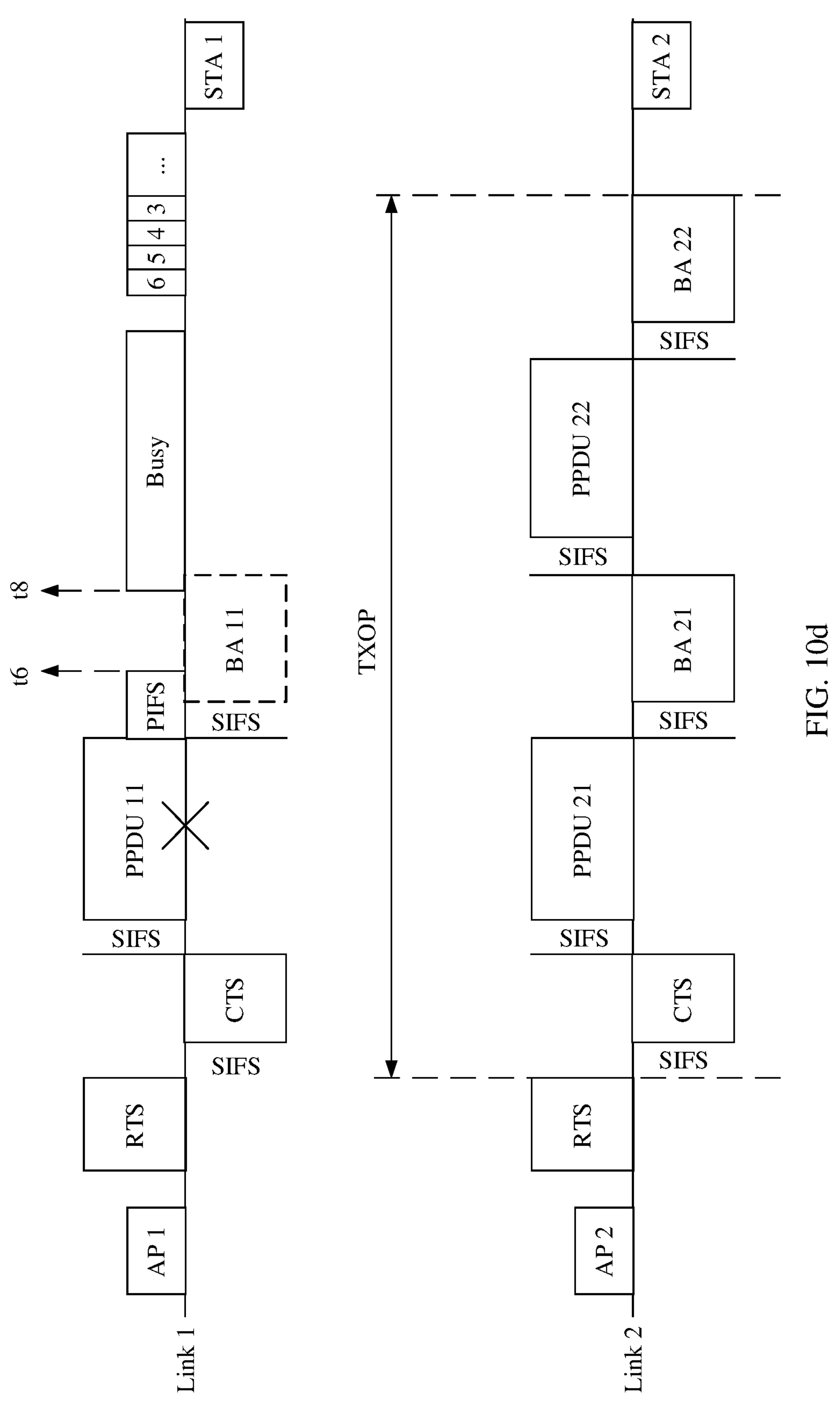

For example, as shown in FIG. 10*c* or FIG. 10*d*, the status of the first link becomes busy at a moment t8 after t6. In this case, the transmit MLD triggers the backoff procedure after the first link is idle. Subsequently, synchronous transmission on multiple links may be performed by using the methods provided in FIG. 4 to FIG. 6*b*.

According to this solution, when an error occurs in the third PPDU on the first link, the transmit MLD may perform the PIFS recovery. After the PIFS recovery ends, the transmit MLD waits until the sending moment of the second PPDU on the second link. If the first link is idle in a waiting process, the first PPDU is sent at a start moment of the second PPDU, to implement synchronous transmission on the first link and the second link, reduce interference between multiple links, and improve transmission performance.

Figure 11:
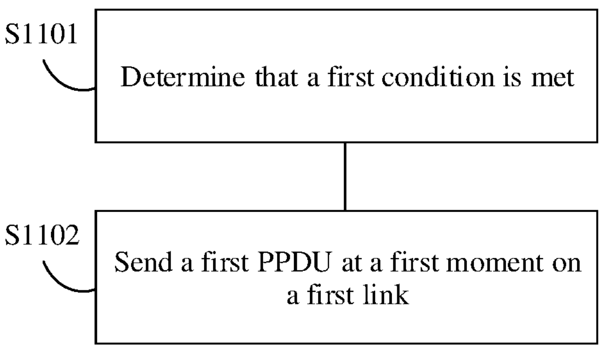
FIG. 11 is a schematic flowchart of another multi-link synchronous transmission method according to an embodiment of this application.

For a BA error, an example of a BA error on a first link and normal transmission on a second link is used. As shown in FIG. 11, the method may include the following steps.

S1101: A transmit MLD determines that a first condition is met.

S1102: The transmit MLD sends a first PPDU to a receive MLD at a first moment on a first link.

The first condition includes: (1) A response frame of a second PPDU on the first link fails to be received; and (2) An interval between the first moment and a second moment is an SIFS, and an energy detection result between the first moment and the second moment is less than or equal to a first threshold.

Third duration is between the second moment and a predicted end moment of the response frame of the second PPDU, and the third duration may be a frame alignment error, for example, 8 microseconds (μs). In other words, the second moment is an actual end moment of a response frame of a third PPDU on a second link, and an interval between the actual end moment of the response frame of the third PPDU and the predicted end moment of the response frame of the second PPDU is the third duration. An end moment of the third PPDU is the same as an end moment of the second PPDU. It may be understood that the second moment is not earlier than the predicted end moment of the response frame of the second PPDU.

It may be understood that, the predicted end moment of the response frame of the second PPDU may be a moment after a length of the response frame from a moment at which the transmit MLD receives the response frame assuming that the second PPDU is normally transmitted. Alternatively, an interval between the predicted end moment of the response frame of the second PPDU and the end moment of the second PPDU is a sum of the SIFS and the length of the response frame.

Optionally, that a response frame of a second PPDU fails to be received may be: A PHY-RXSTART.indication of the response frame is received, but the response frame is not successfully received, for example, the response frame fails to be decoded.

The first PPDU is used to retransmit a portion of or all information of the second PPDU. Optionally, whether the first PPDU is finally used to retransmit a portion of or all information of the second PPDU may be determined based on a decoding status of the response frame of the second PPDU. This is not specifically limited in this application.

In other words, in this application, after the response frame of the second PPDU on the first link fails to be received, the transmit MLD performs energy detection in an SIFS after the third duration starting from the predicted end moment of the response frame. When an energy detection result is less than or equal to the first threshold, the first PPDU is sent.

Optionally, the transmit MLD may perform one or more energy detections between the first moment and the second moment. When one energy detection is performed, if a result of the energy detection is less than or equal to the first threshold, the first PPDU may be sent at the first moment. When multiple energy detections are performed, the first PPDU may be sent at the first moment if results of the multiple energy detections are all less than or equal to the first threshold. Alternatively, the first PPDU may be sent at the first moment if results of a part of the multiple energy detections are less than or equal to the first threshold, where a quantity of the part of energy detections may be greater than a threshold.

Optionally, the first threshold may be lower than a second threshold, and the second threshold may be an energy detection threshold in the 802.11ax standard. For example, the second threshold may be −62 dBm in 20 MHz channel space, and the first threshold may be −72 dBm in the 20 MHz channel space. In other words, the energy detection threshold may be reduced from −62 dBm to −72 dBm in the 20 MHz channel space.

According to this solution, after an error occurs in the response frame of the second PPDU on the first link, the transmit MLD may start to perform energy detection on the first link at the predicted end moment of the response frame. If an energy detection result is less than or equal to the first threshold in the SIFS, it is considered that the link is idle, and the first PPDU is sent after the SIFS from the predicted end moment of the response frame, to retransmit the second PPDU. Normally, an interval between two adjacent frames on the second link is an SIF S. After the error recovery on the first link, an interval between the response frame of the second PPDU and the first PPDU is also an SIFS. In this way, start times of the first PPDU and a PPDU on the second link may be aligned, and end times of the first PPDU and the PPDU on the second link may be aligned, to implement synchronous transmission on multiple links, reduce interference between the multiple links, and improve transmission performance.

Figure 12:
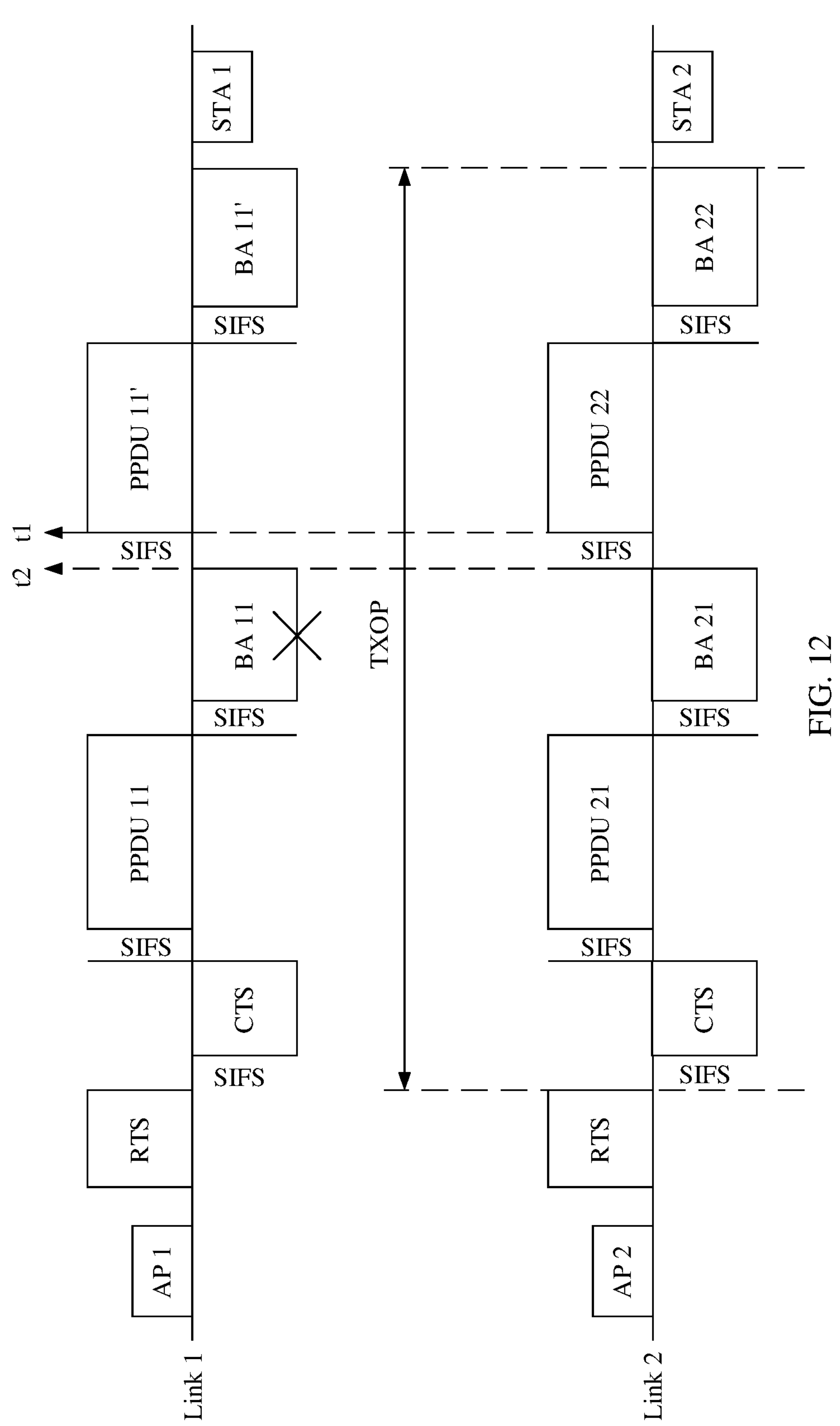
FIG. 12 is a schematic diagram of an application of another multi-link synchronous transmission method according to an embodiment of this application.

For example, the first link is a link 1, the second link is a link 2, the transmit MLD is an AP, the receive MLD is a STA, and the response frame is a BA. As shown in FIG. 12, the second PPDU is a PPDU 11, and a BA 11 is a response frame of the PPDU 11. The first PPDU is a PPDU 11', and a BA 11' is a response frame of the PPDU 11'.

It should be noted that FIG. 12 is described by using an example in which an actual end moment of the BA 21 is the same as a predicted end moment of the BA 11, that is, the third duration is 0. Certainly, the third duration may not be 0.

In this example, after the BA 11 fails to be transmitted, the transmit MLD performs the energy detection on the first link in the SIFS starting from the actual end moment (t2) of the BA 21, to obtain a detection result. If the detection result is less than or equal to the first threshold, the transmit MLD sends the PPDU 11' at t1. An interval between t1 and an end moment of the BA 11 is the SIFS.

The foregoing is the multi-link synchronous transmission method in the PPDU error scenario and the BA error scenario in this application.

In addition, the New ETSI 301893 regulation limits a gap (Gap) between two adjacent frames in a TXOP to an SIFS (16 μs) or PIFS (25 μs). If an interval between two adjacent frames exceeds 25 μs, the interval is referred to as a pause in the regulation, and a length of the pause should be greater than 100 μs. In view of the limitation of the regulation, this application proposes the following PIFS recovery methods.

It should be noted that the following embodiment is described by using an example in which one of a transmit MLD and a receive MLD has an STR capability, the other does not have the STR capability, multiple links between the transmit MLD and the receive MLD include a first link and a second link, a PPDU error occurs on the first link, and no error occurs in transmission on the second link.

In a possible implementation, after a first PPDU on the first link fails to be transmitted, the transmit MLD sends a second PPDU at a first moment on the first link. The second PPDU is used to retransmit an error part of the first PPDU.

When an interval between a sending moment of a third PPDU on the second link and an end moment of the first PPDU is greater than 100 μs, the first moment is the sending moment of the third PPDU. The third PPDU is a PPDU next to a fourth PPDU on the second link, and an end moment of the fourth PPDU is the same as the end moment of the first PPDU. When the interval between the sending moment of the third PPDU on the second link and the end moment of the first PPDU is less than 100 μs, the first moment is 100 μs later than the end moment of the first PPDU. In other words, an interval between the first moment and the end moment of the first PPDU is 100 μs.

An end moment of the second PPDU is the same as an end moment of the third PPDU.

Optionally, the transmit MLD may perform PIFS recovery on the first link between the end moment of the first PPDU and the first moment. A PIFS recovery start time may be the end moment of the first PPDU or another moment. This is not specifically limited in this application.

Optionally, if a PIFS recovery end time is earlier than the first moment, the transmit MLD may monitor a status of the first link between the PIFS recovery end time and the first moment. If the first link is idle in the time period, the second PPDU is sent at the first moment.

For example, it is assumed that the first link is a link 1, the second link is a link 2, the transmit MLD is an AP, the receive MLD is a STA, and a response frame is a BA. The first PPDU is a PPDU 11, and a BA 11 is a response frame of the PPDU 11. The second PPDU is a PPDU 11', and a BA 11' is a response frame of the PPDU 11'. The fourth PPDU is a PPDU 21, and a BA 21 is a response frame of the PPDU 21. The third PPDU is a PPDU 22, and a BA 22 is a response frame of the PPDU 22.

Figure 13A:
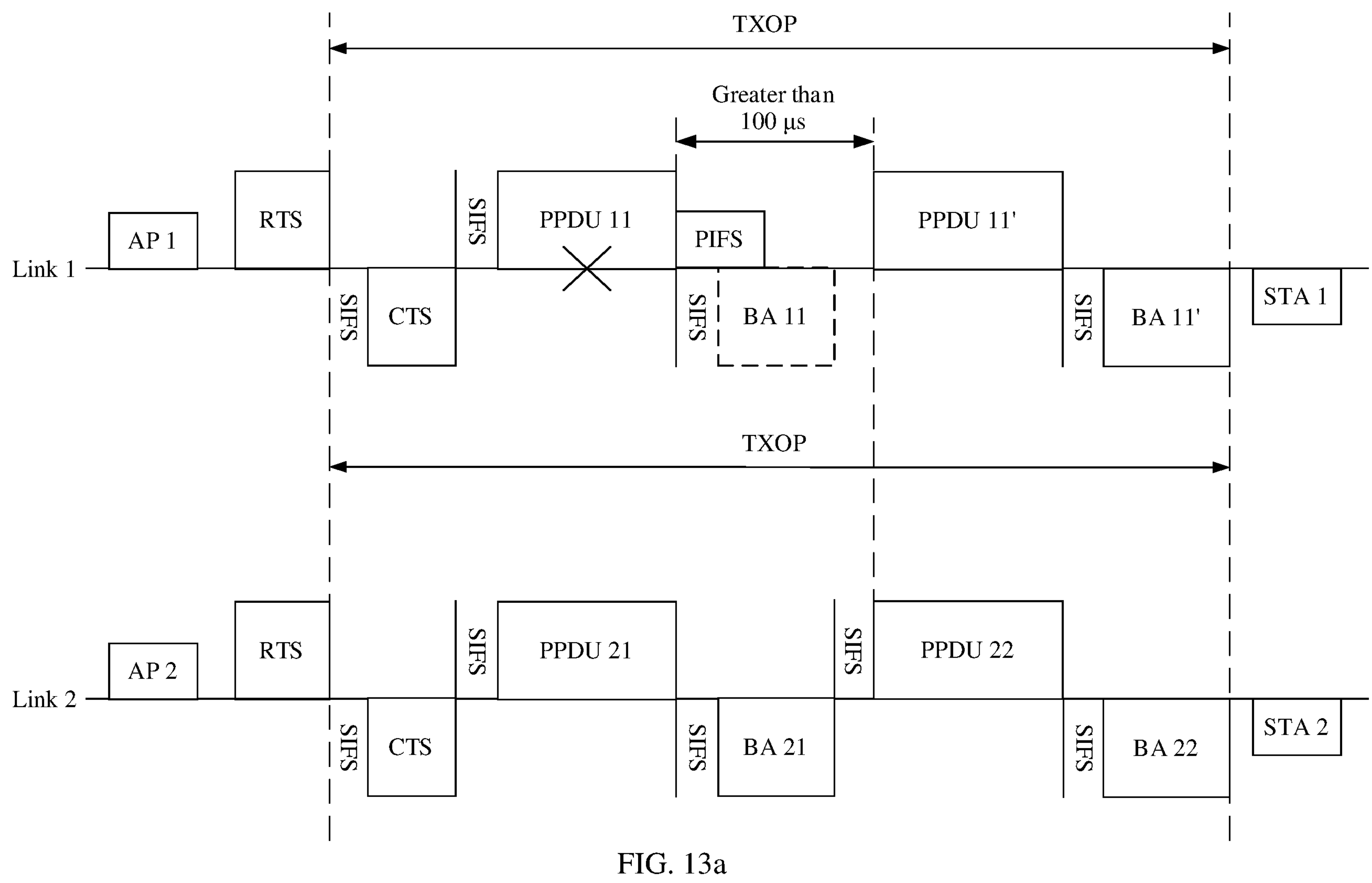
FIG. 13*a* to FIG. 15 are schematic diagrams of an application of another multi-link synchronous transmission method according to an embodiment of this application.
Figure 13B:
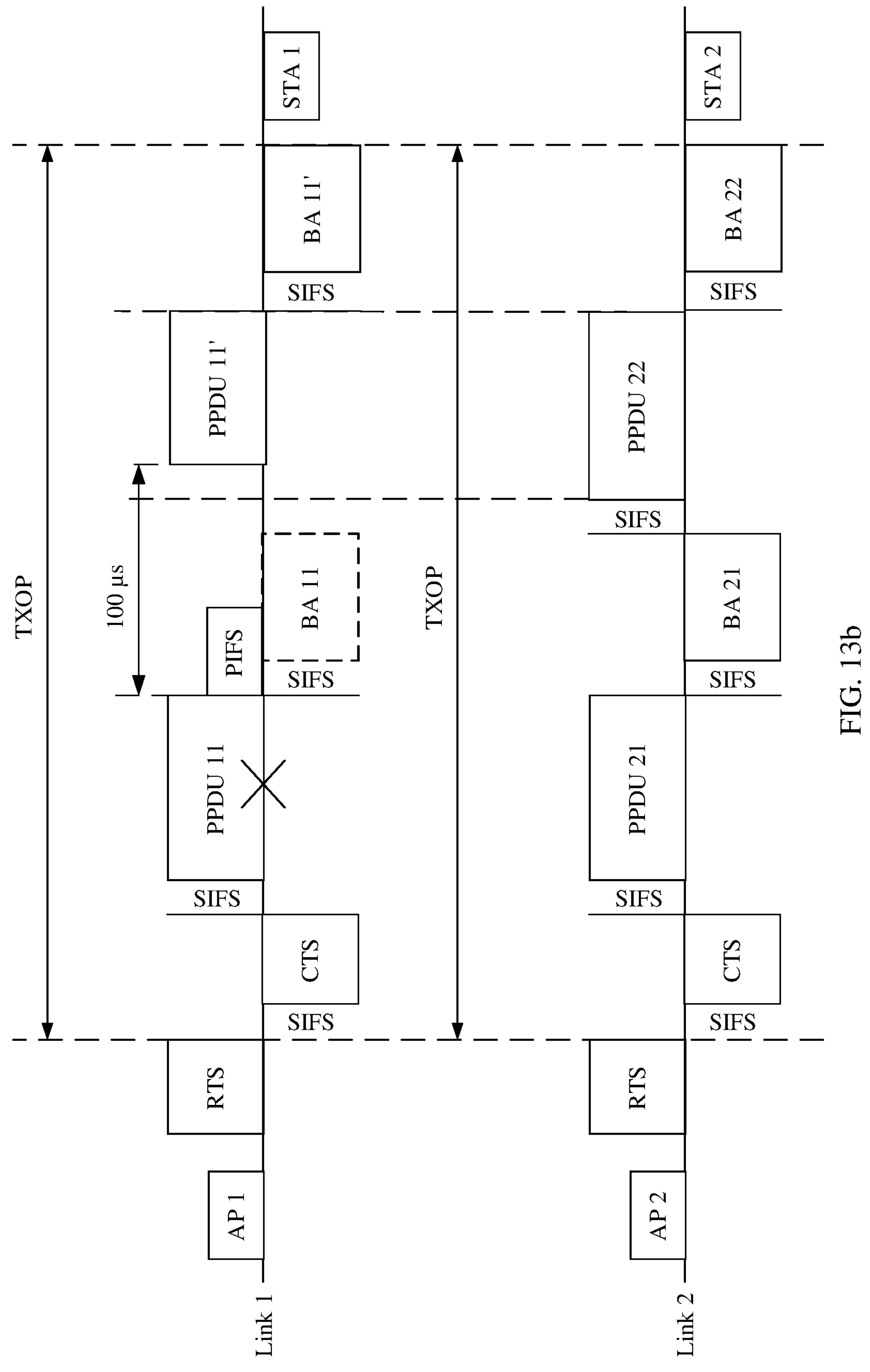

As shown in FIG. 13*a*, if an interval between a sending moment of the PPDU 22 and an end moment of the PPDU 11 is greater than 100 μs, a sending moment of the PPDU 11' is the same as the sending moment of the PPDU 22. As shown in FIG. 13*b*, if the interval between the sending moment of the PPDU 22 and the end moment of the PPDU 11 is less than 100 μs, the sending moment of the PPDU 11' is 100 μs later than the end moment of the PPDU 11.

Optionally, in this manner, the transmit MLD may be an STR MLD or non-STR MLD. This is not specifically limited in this application.

According to this solution, an interval between a start moment of the second PPDU and the end moment of the first PPDU may be greater than or equal to 100 μs. In this way, synchronous transmission on multiple links can be implemented in an error recovery scenario, and the European regulation 301893 can be met.

In another possible implementation, the transmit MLD is a non-STR MLD, the receive MLD is an STR MLD, and the interval between a sending moment of the third PPDU on the second link and the end moment of the first PPDU is less than 100 μs. The third PPDU is a PPDU next to the fourth PPDU on the second link, and the end moment of the fourth PPDU is the same as the end moment of the first PPDU.

In this case, after the first PPDU on the first link fails to be transmitted, the transmit MLD sends the second PPDU at the first moment on the first link. The second PPDU is used to retransmit the error part of the first PPDU.

The first moment is a sending moment of a fifth PPDU on the second link, and the fifth PPDU is a PPDU next to the third PPDU on the second link.

Optionally, the transmit MLD may perform the PIFS recovery on the first link between the end moment of the first PPDU and the first moment. The PIFS recovery start time may be the end moment of the first PPDU, or the PIFS recovery end moment may be the sending moment of the fifth PPDU. Certainly, the PIFS recovery start moment or the PIFS recovery end moment may be another moment. This is not specifically limited in this application.

Optionally, if the PIFS recovery start time is the end moment of the first PPDU, after the PIFS recovery ends, the transmit MLD may wait until a start moment of the fifth PPDU, and monitor the status of the first link between the PIFS recovery end moment and the start moment of the fifth PPDU. If the first link is idle in the time period, the second PPDU is sent at the start moment of the fifth PPDU.

Further, optionally, when the transmit MLD monitors the status of the first link between the PIFS recovery end moment and the start moment of the fifth PPDU, an energy detection threshold may be lowered between the end moment of the third PPDU and the start moment of the fifth PPDU, to detect the status of the first link. This implements strict monitoring.

For example, it is assumed that the first link is a link 1, the second link is a link 2, the transmit MLD is an AP, the receive MLD is a STA, and a response frame is a BA. The first PPDU is a PPDU 11, and a BA 11 is a response frame of the PPDU 11. The second PPDU is a PPDU 11', and a BA 11' is a response frame of the PPDU 11'. The fourth PPDU is a PPDU 21, and a BA 21 is a response frame of the PPDU 21. The third PPDU is a PPDU 22, and a BA 22 is a response frame of the PPDU 22. The fifth PPDU is a PPDU 23, and a BA 23 is a response frame of the PPDU 23.

Figure 14A:
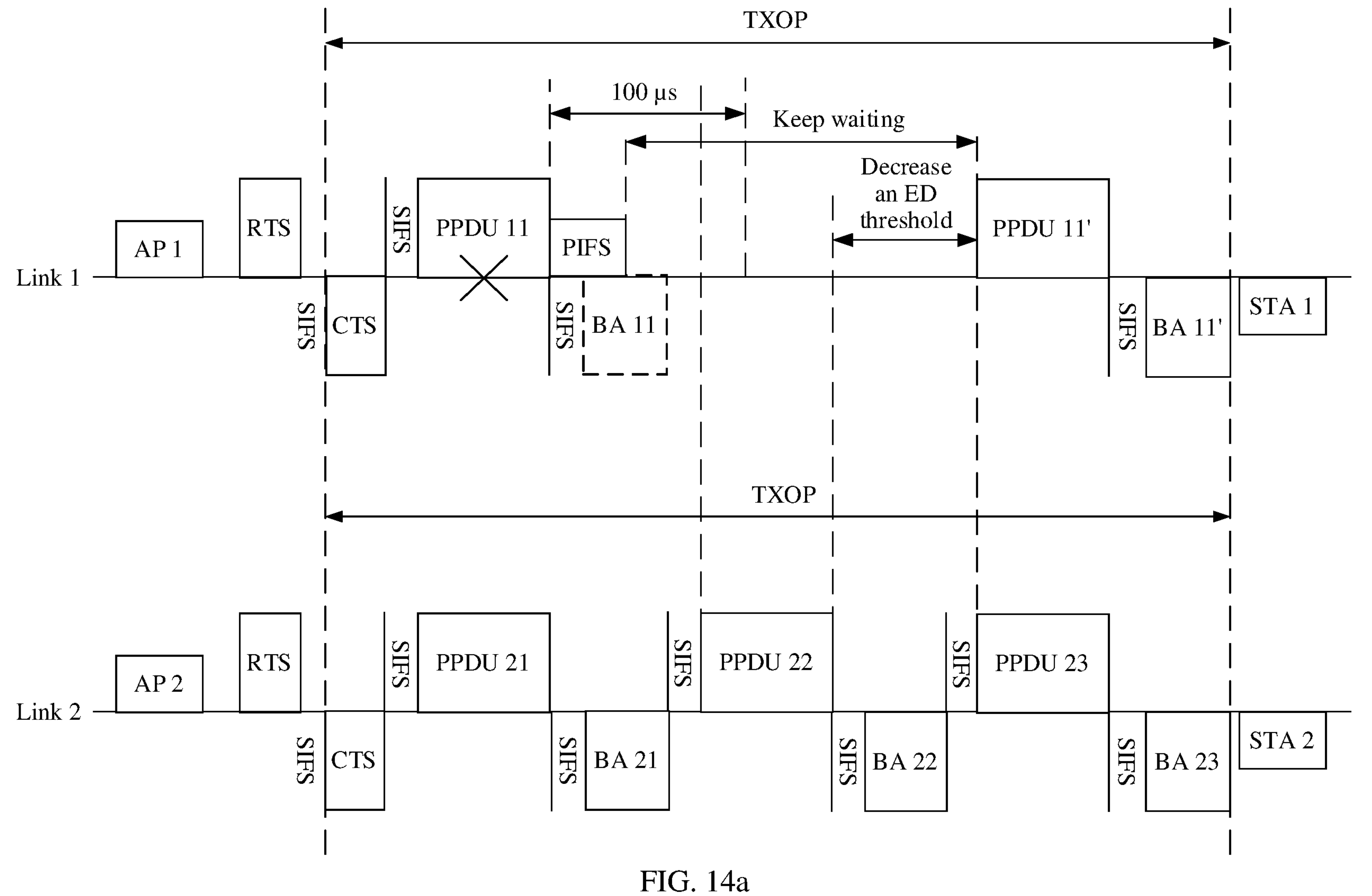

As shown in FIG. 14*a*, an interval between a sending moment of the PPDU 22 and an end moment of the PPDU 11 is less than 100 μs, and the PIFS recovery start time is the end moment of the PPDU 11. After the PIFS recovery ends, the transmit MLD waits and monitors the status of the first link until a start moment of the PPDU 23. A lower energy detection threshold is used between an end moment of the PPDU 22 and the start moment of the PPDU 23, to monitor the status of the first link.

Optionally, if the PIFS recovery end time is the start moment of the fifth PPDU, after the end moment of the first PPDU, the transmit MLD waits until the start moment of the fifth PPDU, and monitors the status of the first link between the end moment of the first PPDU and the start moment of the fifth PPDU. If the first link is idle in the time period, the second PPDU is sent at the start moment of the fifth PPDU.

Further, optionally, when the transmit MLD monitors the status of the first link between the end moment of the first PPDU and the start moment of the fifth PPDU, the energy detection threshold may be lowered between the end moment of the third PPDU and the start moment of the fifth PPDU, to detect the status of the first link. This implements strict monitoring.

For example, it is assumed that the first link is a link 1, the second link is a link 2, the transmit MLD is an AP, the receive MLD is a STA, and a response frame is a BA. The first PPDU is a PPDU 11, and a BA 11 is a response frame of the PPDU 11. The second PPDU is a PPDU 11', and a BA 11' is a response frame of the PPDU 11'. The fourth PPDU is a PPDU 21, and a BA 21 is a response frame of the PPDU 21. The third PPDU is a PPDU 22, and a BA 22 is a response frame of the PPDU 22. The fifth PPDU is a PPDU 23, and a BA 23 is a response frame of the PPDU 23.

Figure 14B:
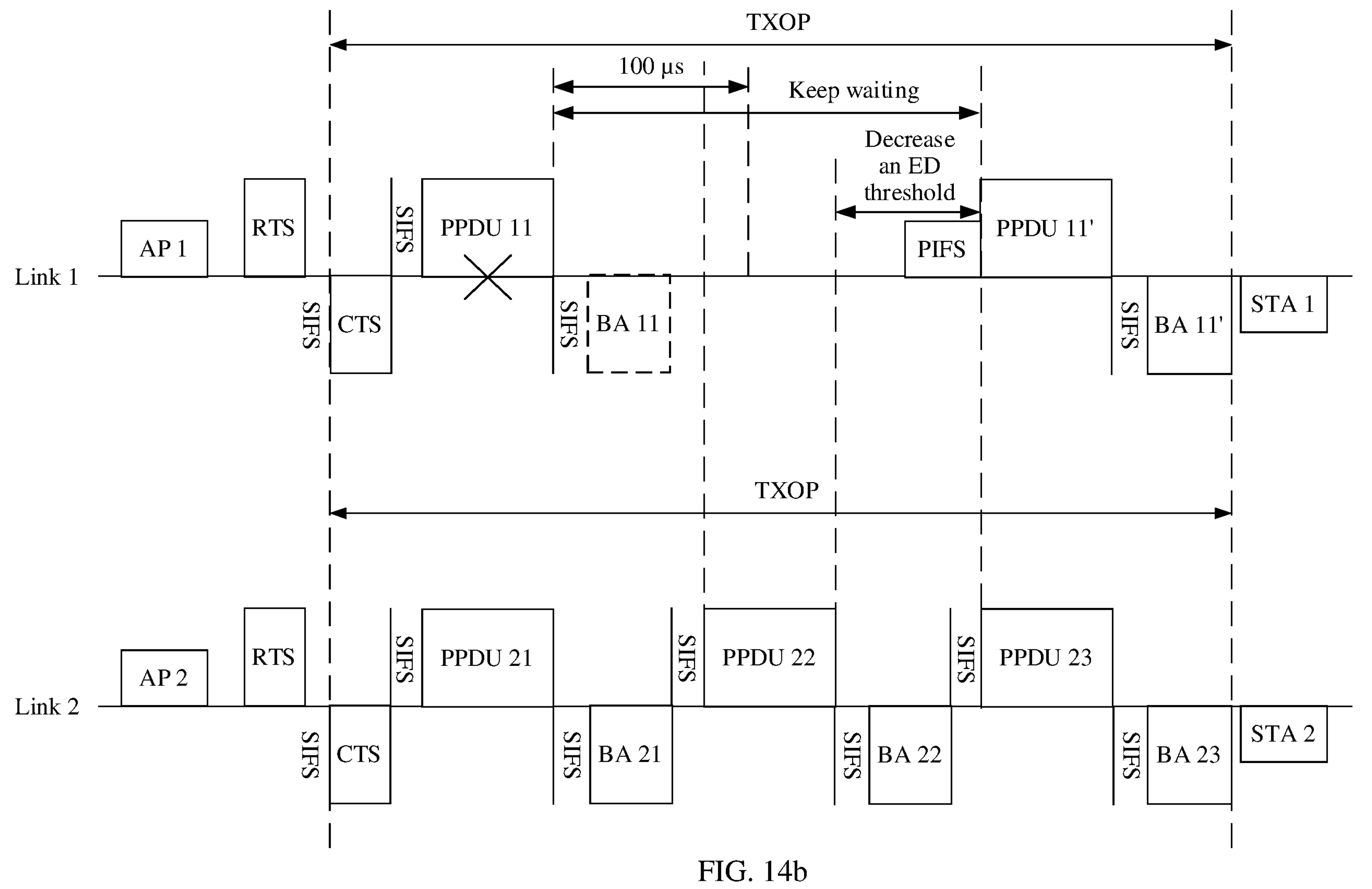

As shown in FIG. 14*b*, an interval between a sending moment of the PPDU 22 and an end moment of the PPDU 11 is less than 100 μs, and the PIFS recovery end moment is an end moment of the PPDU 23. After the end moment of the PPDU 11, the transmit MLD waits and monitors the status of the first link until a start moment of the PPDU 23. The lower energy detection threshold is used between an end moment of the PPDU 22 and the start moment of the PPDU 23, to monitor the status of the first link.

According to this solution, the interval between the start moment of the second PPDU and the end moment of the first PPDU may be greater than 100 μs. In this way, synchronous transmission on multiple links can be implemented in an error recovery scenario, and the European regulation 301893 can be met.

In still another possible implementation, for a scenario in which the non-STR MLD participates in multi-link communication, a length of a response frame of a PPDU is greater than a first threshold. The first threshold is greater than or equal to 68 μs.

In this case, after the first PPDU on the first link fails to be transmitted, the transmit MLD sends the second PPDU at the first moment on the first link. The second PPDU is used to retransmit the error part of the first PPDU.

The first moment is the sending moment of the third PPDU on the second link. The third PPDU is a PPDU next to the fourth PPDU on the second link, and the end moment of the fourth PPDU is the same as the end moment of the first PPDU.

According to this solution, the end moment of the fourth PPDU is the same as the end moment of the first PPDU, the third PPDU is a PPDU next to the fourth PPDU, and transmission on the second link is normal. Therefore, an interval between the third PPDU and the fourth PPDU is two SIFSs plus a length of the response. Because a length of the two SIFSs is 32 μs, and a length of the response frame is greater than or equal to 68 μs, an interval between a start moment of the third PPDU and the end moment of the fourth PPDU is greater than or equal to 100 μs. When the second PPDU is sent at the start moment of the third PPDU, the interval between the start moment of the second PPDU and the end moment of the first PPDU is equal to the interval between the start moment of the third PPDU and the end moment of the fourth PPDU, and both are greater than or equal to 100 μs. In this way, synchronous transmission on multiple links can be implemented in an error recovery scenario, and the European regulation 301893 can be met.

Optionally, the transmit MLD may perform the PIFS recovery on the first link between the end moment of the first PPDU and the first moment. The PIFS recovery start time is not specifically limited in this application.

For example, it is assumed that the first link is a link 1, the second link is a link 2, the transmit MLD is an AP, the receive MLD is a STA, and a response frame is a BA. The first PPDU is a PPDU 11, and a BA 11 is a response frame of the PPDU 11. The second PPDU is a PPDU 11', and a BA 11' is a response frame of the PPDU 11'. The fourth PPDU is a PPDU 21, and a BA 21 is a response frame of the PPDU 21. The third PPDU is a PPDU 22, and a BA 22 is a response frame of the PPDU 22.

Figure 15:
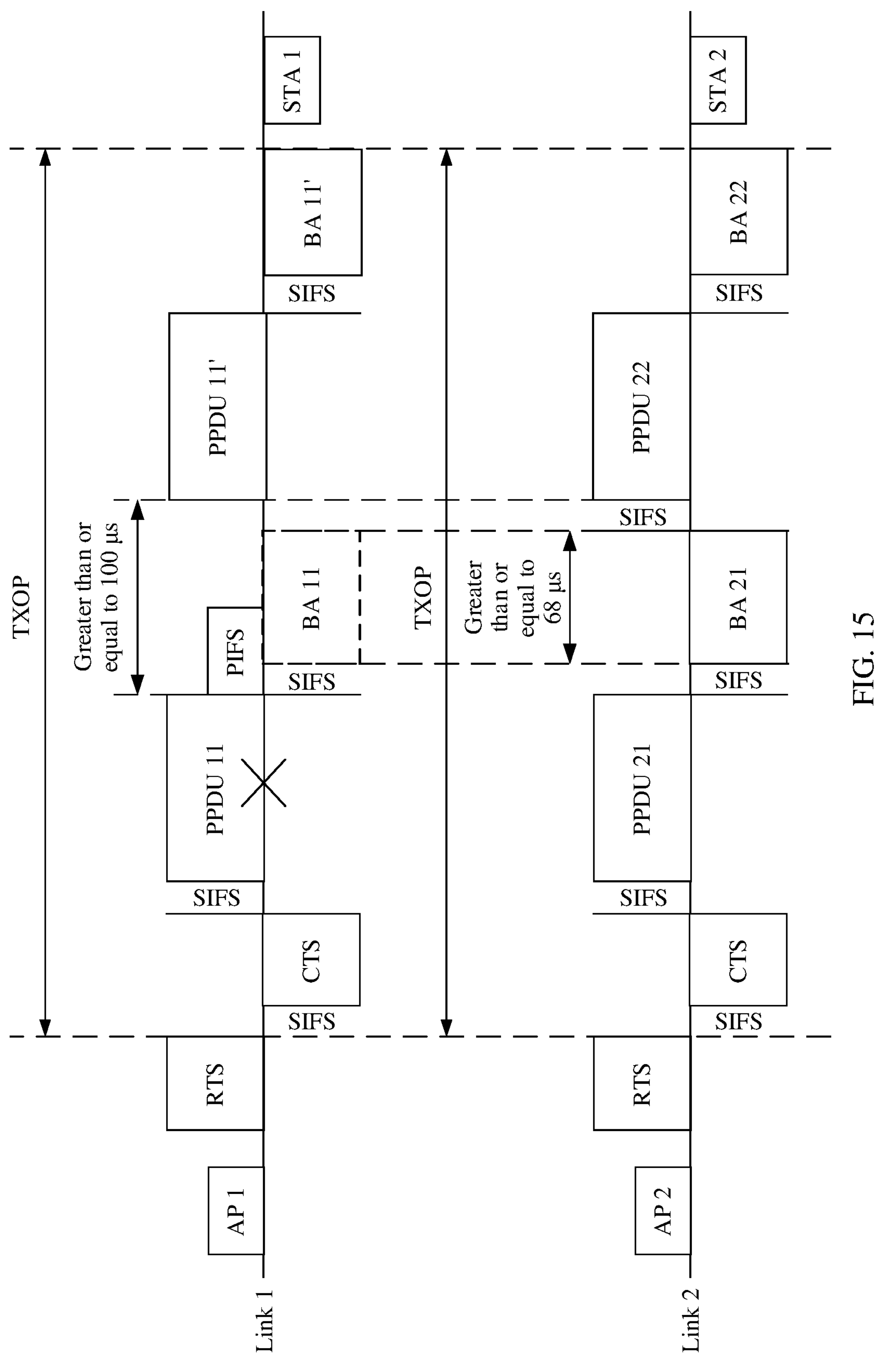

As shown in FIG. 15, a length of the BA is greater than or equal to 68 μs, so that an interval between a start moment of the PPDU 22 and an end moment of the PPDU 21 is greater than or equal to 100 μs. Correspondingly, an interval between a start moment of the PPDU 11' and an end moment of the PPDU 11 is greater than or equal to 100 μs.

An interval between a sending moment of the PPDU 22 and the end moment of the PPDU 11 is greater than 100 μs. In this case, a sending moment of the PPDU 11' is the same as the sending moment of the PPDU 22. As shown in FIG. **13*b*, if the interval between the sending moment of the PPDU 22 and the end moment of the PPDU 11 is less than 100 μs, the sending moment of the PPDU 11' is 100 μs later than the end moment of the PPDU 11**.

Optionally, when the response frame is a BA, padding (padding) or BA frame aggregation may be used in length to make the length of the BA greater than or equal to the first threshold.

Optionally, because of a frame structure of an ACK, the ACK cannot be padded to make a length of the ACK greater than or equal to the first threshold. In this case, it may be specified that the ACK is not used as a response frame in the scenario in which the non-STR MLD participates in multi-link communication. Further, it may be specified that the BA may be used as a response frame of a PPDU including a single MPDU, or that the PPDU including a single MPDU is not used.

In still another possible implementation, an interval between a start moment of a PPDU used for retransmission and an end moment of a PPDU that fails to be transmitted may be greater than or equal to 100 μs in a backoff recovery mechanism. In this way, when the non-STR MLD is used as a transmit end, it may be specified that backoff recovery instead of PIFS recovery is used for error recovery. This circumvents the European Regulation 301893, and implements synchronous transmission on multiple links in the error recovery scenario.

The foregoing describes the multi-link synchronous transmission method in embodiments of this application, and the following describes a transmit MLD in embodiments of this application.

Figure 16:
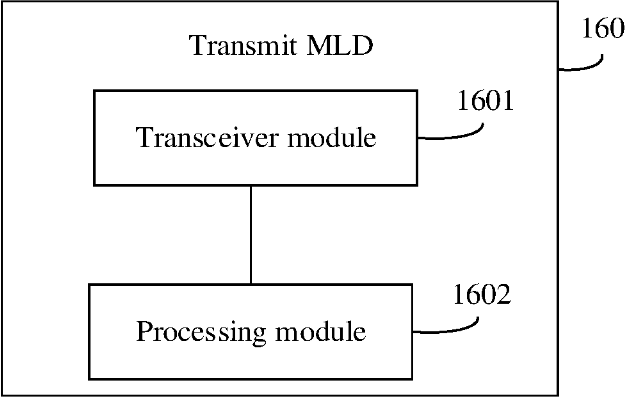
FIG. 16 is a schematic diagram of a structure of a transmit MLD according to an embodiment of this application.

FIG. 16 shows a transmit MLD 160 according to this application. The transmit MLD 160 includes: a processing module 1602, configured to determine that a first condition is met, where the first condition includes: (1) A backoff counter of a first link is 0, and (2) A second transmission frame is located in a transmission opportunity TXOP on a second link; and a transceiver module 1601, configured to send a first transmission frame to a receive MLD at a first moment on the first link when the first condition is met, where the first moment is determined based on a second moment and/or a third moment, the second moment is a moment at which the backoff counter of the first link decreases to 0, and the third moment is a sending moment of the second transmission frame on the second link.

It should be understood that the transmit MLD 160 has any function of the transmit MLD in the foregoing backoff-related method embodiments. For specific details, refer to the foregoing method. Details are not described herein again.

The foregoing describes the transmit MLD 160 in embodiments of this application, and the following describes a possible product form of the transmit MLD 160. It should be understood that any product having the feature of the transmit MLD 160 described in FIG. 16 falls within the protection scope of this application. It should be further understood that the following description is merely an example, and is not limited to a product form of the transmit MLD 160 in embodiments of this application.

In a possible product form, the transmit MLD 160 described in this embodiment of this application may be implemented by a general bus architecture.

The transmit MLD 160 includes a processor and a transceiver that is internally connected to and communicates with the processor.

The processor is configured to determine that a first condition is met. The first condition includes: (1) A backoff counter of a first link is 0, and (2) A second transmission frame is located in a transmission opportunity TXOP on a second link.

The transceiver is configured to send a first transmission frame to a receive MLD at a first moment on the first link when the first condition is met. The first moment is determined based on a second moment and/or a third moment, the second moment is a moment at which the backoff counter of the first link decreases to 0, and the third moment is a sending moment of the second transmission frame on the second link.

Optionally, the transmit MLD 160 may further include a memory, and the memory is configured to store instructions executed by the processor.

In a possible product form, the transmit MLD 160 described in this embodiment of this application may be implemented by a general-purpose processor.

The general-purpose processor that implements the transmit MLD 160 includes a processing circuit and an output interface that is internally connected to and communicates with the processing circuit.

The processing circuit is configured to determine that a first condition is met. The first condition includes: (1) A backoff counter of a first link is 0, and (2) A second transmission frame is located in a transmission opportunity TXOP on a second link.

The output interface is configured to send a first PPDU to a receive MLD at a first moment on the first link when the first condition is met. The first PPDU is used to retransmit a portion of or all information of a second PPDU on the first link.

Optionally, the general-purpose processor may further include a storage medium, and the storage medium is configured to store instructions executed by the processing circuit.

In a possible product form, the transmit MLD 160 described in this embodiment of this application may alternatively be implemented by the following components: one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that the transmit MLD 160 in each product form has any function of the transmit MLD in the foregoing backoff-related method embodiments. Details are not described herein again.

Figure 17:
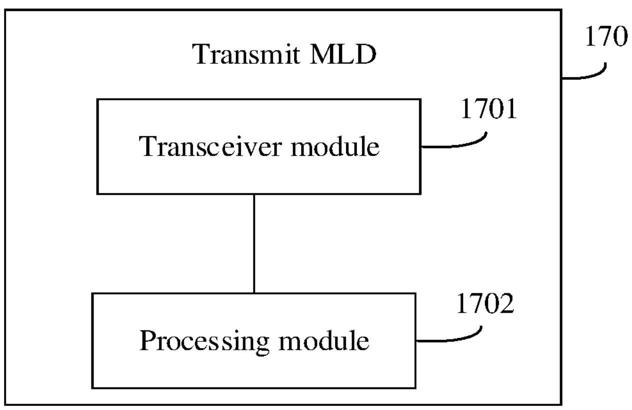
FIG. 17 is a schematic diagram of a structure of another transmit MLD according to an embodiment of this application.

FIG. 17 shows another transmit MLD 170 according to this application. The transmit MLD 170 includes:

a processing module 1702, configured to determine that a first condition is met, where the first condition includes: (1) A response frame of a second PPDU fails to be received; and (2) An interval between a first moment and a second moment is a short interframe space, an energy detection result between the first moment and the second moment is less than or equal to a first threshold, and third duration is between the second moment and a predicted end moment of the response frame of the second PPDU; and a transceiver module 1701, configured to send a first PPDU to a receive MLD at the first moment on a first link when the first condition is met, where the first PPDU is used to retransmit a portion of or all information of a second PPDU on the first link.

It should be understood that the transmit MLD 170 has any function of the transmit MLD in the foregoing method embodiments in which an error occurs in a response frame. For specific details, refer to the foregoing method. Details are not described herein again.

The foregoing describes the transmit MLD 170 in embodiments of this application, and the following describes a possible product form of the transmit MLD 170. It should be understood that any product having the feature of the transmit MLD 170 described in FIG. 17 falls within the protection scope of this application. It should be further understood that the following description is merely an example, and is not limited to a product form of the transmit MLD 170 in embodiments of this application.

In a possible product form, the transmit MLD 170 described in this embodiment of this application may be implemented by a general bus architecture.

The transmit MLD 170 includes a processor and a transceiver that is internally connected to and communicates with the processor.

The processor is configured to determine that a first condition is met. The first condition includes: (1) A response frame of a second PPDU fails to be received; and (2) An interval between a first moment and a second moment is a short interframe space, an energy detection result between the first moment and the second moment is less than or equal to a first threshold, and third duration is between the second moment and a predicted end moment of the response frame of the second PPDU.

The transceiver is configured to send a first PPDU to a receive MLD at the first moment on a first link when the first condition is met. The first PPDU is used to retransmit a portion of or all information of the second PPDU on the first link.

Optionally, the transmit MLD 170 may further include a memory, and the memory is configured to store instructions executed by the processor.

In a possible product form, the transmit MLD 170 described in this embodiment of this application may be implemented by a general-purpose processor.

The general-purpose processor that implements the transmit MLD 170 includes a processing circuit and an output interface that is internally connected to and communicates with the processing circuit.

The processing circuit is configured to determine that a first condition is met. The first condition includes: (1) A response frame of a second PPDU fails to be received; and (2) An interval between a first moment and a second moment is a short interframe space, an energy detection result between the first moment and the second moment is less than or equal to a first threshold, and third duration is between the second moment and a predicted end moment of the response frame of the second PPDU.

The output interface is configured to send a first PPDU to a receive MLD at the first moment on a first link when the first condition is met. The first PPDU is used to retransmit a portion of or all information of the second PPDU on the first link.

Optionally, the general-purpose processor may further include a storage medium, and the storage medium is configured to store instructions executed by the processing circuit.

In a possible product form, the transmit MLD 170 described in this embodiment of this application may alternatively be implemented by the following components: one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that the transmit MLD 170 in each product form has any function of the transmit MLD in the foregoing method embodiments in which an error occurs in a response frame. Details are not described herein again.

A person of ordinary skill in the art may be aware that, in combination with the examples described in embodiments disclosed in this specification, method steps and units may be implemented by electronic hardware, computer software, or a combination thereof. To clearly describe the interchangeability between hardware and software, the foregoing has generally described steps and compositions of each embodiment according to functions. Whether the functions are executed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, multiple units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on multiple network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware or in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A multi-link synchronous transmission method, wherein the method is performed at a transmit multi-link device (MLD) which is configured to communicate with a receive MLD over a first link and a second link, one of the transmit MLD and the receive MLD has a simultaneous transmit and receive (STR) capability, and the other does not have the STR capability, and the method comprises:

sending, by the transmit MLD in response to a first condition being met, a first transmission frame to the receive MLD at a first moment on the first link, wherein the first moment is determined based on at least one of:

a second moment at which a backoff counter of the first link decreases to 0, or a third moment which is a sending moment of a second transmission frame on the second link, wherein the first condition comprises:

(1) the backoff counter of the first link is 0, and (2) the second transmission frame is located in a transmission opportunity (TXOP) on the second link, and wherein the first moment is the third moment in response to the second moment being earlier than the third moment, and the first link being idle between the second moment and the third moment, or the first moment is the second moment in response to the second moment being later than the third moment and earlier than a fourth moment, wherein the fourth moment is an end moment of the second transmission frame.

2. The method according to claim 1, wherein the first condition further comprises: a third transmission frame on the first link fails to be transmitted, wherein the first transmission frame is used to retransmit an error part of the third transmission frame, the second transmission frame is the 1st transmission frame that is after a reference transmission frame on the second link and that has a same type as the reference transmission frame, and an end moment of the reference transmission frame is the same as an end moment of the third transmission frame.

3. The method according to claim 2, wherein each of the first transmission frame and the third transmission frame is an uplink trigger frame.

4. The method according to claim 1, wherein the first moment is the second moment in response to:

the second moment being later than the third moment and earlier than the fourth moment, and duration between the second moment and the fourth moment being greater than or equal to first duration.

5. A transmit multi-link device configured to communicate with a receive multi-link device over a first link and a second link, the transmit multi-link device comprising:

a processor configured to determine that a first condition is met, wherein the first condition comprises:

(1) a backoff counter of the first link is 0, and (2) a second transmission frame is located in a transmission opportunity (TXOP) on the second link; and a transceiver configured to, in response to the first condition being met, send a first transmission frame to the receive multi-link device at a first moment on the first link, wherein the processor is configured to determine the first moment based on at least one of:

a second moment at which the backoff counter of the first link decreases to 0, or a third moment which is a sending moment of the second transmission frame on the second link, wherein the first condition further comprises: a third transmission frame on the first link fails to be transmitted, wherein the first transmission frame is used to retransmit an error part of the third transmission frame, the second transmission frame is the 1st transmission frame that is after a reference transmission frame on the second link and that has a same type as the reference transmission frame, and an end moment of the reference transmission frame is the same as an end moment of the third transmission frame, and wherein each of the first transmission frame and the third transmission frame is an uplink trigger frame.

6. The transmit multi-link device according to claim 5, wherein the processor is configured to determine that the first moment is the third moment in response to:

the second moment being earlier than the third moment, and the first link being idle between the second moment and the third moment.

7. The transmit multi-link device according to claim 5, wherein the processor is configured to determine that the first moment is the second moment in response to the second moment being later than the third moment and earlier than a fourth moment, wherein the fourth moment is an end moment of the second transmission frame.

8. The transmit multi-link device according to claim 7, wherein the processor is configured to determine that the first moment is the second moment in response to:

the second moment being later than the third moment and earlier than the fourth moment, and duration between the second moment and the fourth moment being greater than or equal to first duration.

9. The transmit multi-link device according to claim 5, wherein the processor is configured to determine that the first moment is a sending moment of a fourth transmission frame on the second link in response to the second moment being later than the third moment and earlier than a fourth moment, wherein the fourth moment is an end moment of the second transmission frame, and the fourth transmission frame is the 1st transmission frame that is after the second transmission frame and that has a same type as the second transmission frame.

10. The transmit multi-link device according to claim 9, wherein the processor is configured to determine that the first moment is the sending moment of the fourth transmission frame on the second link in response to:

the second moment being later than the third moment and earlier than the fourth moment, and duration between the second moment and the fourth moment being less than or equal to second duration.

11. The transmit multi-link device according to claim 5, wherein the processor is configured to determine that the first moment is a fifth moment in response to:

the second transmission frame being an uplink trigger frame, and the second moment being later than a fourth moment and earlier than the fifth moment, the fourth moment is an end moment of the second transmission frame, the fifth moment is a sending moment of a fourth transmission frame on the second link, and the fourth transmission frame is the 1st uplink trigger frame after the second transmission frame.

12. A multi-link synchronous transmission method, wherein the method is performed at a transmit multi-link device (MLD) which is configured to communicate with a receive MLD over a first link and a second link, one of the transmit MLD and the receive MLD has a simultaneous transmit and receive (STR) capability, and the other does not have the STR capability, and the method comprises:

sending, by the transmit MLD in response to a first condition being met, a first transmission frame to the receive MLD at a first moment on the first link, wherein the first moment is determined based on at least one of:

a second moment at which a backoff counter of the first link decreases to 0, or a third moment which is a sending moment of a second transmission frame on the second link, wherein the first condition comprises:

(1) the backoff counter of the first link is 0, and (2) the second transmission frame is located in a transmission opportunity (TXOP) on the second link, and wherein the first moment is a sending moment of a fourth transmission frame on the second link in response to the second moment being later than the third moment and earlier than a fourth moment, wherein the fourth moment is an end moment of the second transmission frame, and the fourth transmission frame is the 1st transmission frame that is after the second transmission frame and that has a same type as the second transmission frame.

13. The method according to claim 12, wherein the first moment is the sending moment of the fourth transmission frame on the second link in response to:

the second moment being later than the third moment and earlier than the fourth moment, and duration between the second moment and the fourth moment being less than or equal to second duration.

14. The method according to claim 12, wherein the first condition further comprises: a third transmission frame on the first link fails to be transmitted, wherein the first transmission frame is used to retransmit an error part of the third transmission frame, the second transmission frame is the 1st transmission frame that is after a reference transmission frame on the second link and that has a same type as the reference transmission frame, and an end moment of the reference transmission frame is the same as an end moment of the third transmission frame.

15. The method according to claim 14, wherein each of the first transmission frame and the third transmission frame is an uplink trigger frame.

* * * * *